US011224067B2

(12) United States Patent
Golitschek Edler Von Elbwart et al.

(10) Patent No.: US 11,224,067 B2
(45) Date of Patent: Jan. 11, 2022

(54) CONFLICT HANDLING OF MULTIPLE DCI

(71) Applicant: Panasonic Intellectual Property Corporation of America, Torrance, CA (US)

(72) Inventors: Alexander Golitschek Edler Von Elbwart, Hessen (DE); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 77 days.

(21) Appl. No.: 16/373,064

(22) Filed: Apr. 2, 2019

(65) Prior Publication Data
US 2019/0230701 A1    Jul. 25, 2019

Related U.S. Application Data

(63) Continuation of application No. PCT/JP2017/028698, filed on Aug. 8, 2017.

(30) Foreign Application Priority Data

Nov. 4, 2016 (EP) ..................................... 16197426

(51) Int. Cl.
*H04W 72/14* (2009.01)
*H04B 17/336* (2015.01)
(Continued)

(52) U.S. Cl.
CPC .......... *H04W 72/14* (2013.01); *H04B 17/336* (2015.01); *H04L 1/0061* (2013.01);
(Continued)

(58) Field of Classification Search
None
See application file for complete search history.

(56) References Cited

U.S. PATENT DOCUMENTS 9,173,213 B2 * 10/2015 Golitschek Edler Von Elbwart ................ H04L 27/261
10,555,193 B2 * 2/2020 Matsumoto ........... H04W 24/10
(Continued)

FOREIGN PATENT DOCUMENTS

WO    2014/098701 A1    6/2014

OTHER PUBLICATIONS

International Search Report of PCT application No. PCT/JP2017/028698 dated Sep. 12, 2017.
(Continued)

*Primary Examiner* — Nicholas Sloms
(74) *Attorney, Agent, or Firm* — Seed IP Law Group LLP

(57) ABSTRACT

The present disclosure relates to a data transmitting device, data receiving device and the corresponding data transmitting method and data receiving method for transmitting/receiving data over a wireless channel in a communication system. In particular, a first resource grant is received for a data transmission in a subframe and a second resource grant for a data transmission of data in said subframe. Then, it is determined, according to which of the first resource grant and the second resource grant data are to be transmitted in the subframe; and the data is transmitted in the subframe according to the selected first grant or second grant.

11 Claims, 12 Drawing Sheets

(51) Int. Cl.
*H04L 1/00* (2006.01)
*H04W 72/04* (2009.01)
*H04W 72/12* (2009.01)

(52) U.S. Cl.
CPC ..... *H04W 72/042* (2013.01); *H04W 72/0446* (2013.01); *H04W 72/1273* (2013.01); *H04W 72/1289* (2013.01)

(56) References Cited

U.S. PATENT DOCUMENTS

| | | | | |
|---|---|---|---|---|
| 10,880,876 | B2* | 12/2020 | Dinan | H04W 72/0446 |
| 2012/0057547 | A1* | 3/2012 | Lohr | H04L 5/0064 |
| | | | | 370/329 |
| 2013/0208645 | A1* | 8/2013 | Feng | H04W 72/005 |
| | | | | 370/312 |
| 2015/0049740 | A1 | 2/2015 | Lee et al. | |
| 2016/0073391 | A1* | 3/2016 | Awad | H04L 1/1864 |
| | | | | 370/329 |
| 2016/0095134 | A1 | 3/2016 | Chen et al. | |
| 2016/0255650 | A1 | 9/2016 | Xia et al. | |
| 2016/0345355 | A1* | 11/2016 | Andersson | H04W 74/0833 |
| 2017/0013565 | A1* | 1/2017 | Pelletier | H04W 52/343 |
| 2017/0099664 | A1* | 4/2017 | Lunttila | H04L 1/1887 |
| 2017/0127405 | A1* | 5/2017 | Agiwal | H04W 72/0413 |
| 2017/0222749 | A1* | 8/2017 | Dinan | H04L 1/001 |
| 2017/0251464 | A1* | 8/2017 | Mukherjee | H04W 72/14 |
| 2017/0272199 | A1* | 9/2017 | Dinan | H04L 1/001 |
| 2017/0273109 | A1* | 9/2017 | Babaei | H04W 72/1268 |
| 2017/0318595 | A1* | 11/2017 | Dinan | H04W 72/14 |
| 2017/0331602 | A1* | 11/2017 | Hugl | H04L 5/0094 |
| 2017/0353972 | A1* | 12/2017 | Babaei | H04L 5/0098 |
| 2018/0092072 | A1* | 3/2018 | Babaei | H04L 5/0091 |
| 2019/0045505 | A1* | 2/2019 | Yang | H04W 72/14 |
| 2019/0166617 | A1* | 5/2019 | Park | H04W 72/1289 |

OTHER PUBLICATIONS

3GPP TS 36.211 version 13.2.0 Release 13, "LTE; Evolved Universal Terrestrial Radio Access (E-UTRA); Physical channels and modulation", Aug. 2016.
3GPP TS 36.213 version 13.2.0 Release 13, "LTE; Evolved Universal Terrestrial Radio Access (E-UTRA); Physical layer procedures", Aug. 2016.
3GPP TS 36.212 version 13.2.0 Release13, "LTE; Evolved Universal Terrestrial Radio Access (E-UTRA); Multiplexing and channel coding", Aug. 2016.
LTE—The UMTS Long Term Evolution—From Theory to Practice, Edited by Stefanie Sesia, Issam Toufik, Matthew Baker, Chapter 9.3, "Downlink Control Channels", Mar. 2011.
3GPP TR 36.889 V13.0.0, "3rd Generation Partnership Project; Technical Specification Group Radio Access Network; Study on Licensed-Assisted Access to Unlicensed Spectrum; (Release 13)", Jun. 2015.
ETSI EN 301 893 V1.8.1, Broadband Radio Access Networks (BRAN); 5 GHz high performance RLAN; Harmonized EN covering the essential requirements of article 3.2 of the R&TTE Directive, Mar. 2015.
3GPP TST RAN WG1 Meeting #84, R1-160557, "Discussion on multi-subframe scheduling for UL LAA", Feb. 2016.
3GPP TS 36.213 V14.0.0, "3rd Generation Partnership Project; Technical Specification Group Radio Access Network; Evolved Universal Terrestrial Radio Access (E-UTRA); Physical layer procedures (Release 14)", Sep. 2016.
3GPP TSG RAN WG2 #62, R2-082244, "Analysis of HD-FDD error and TX/RX conflict scenarios", May 2008.

* cited by examiner

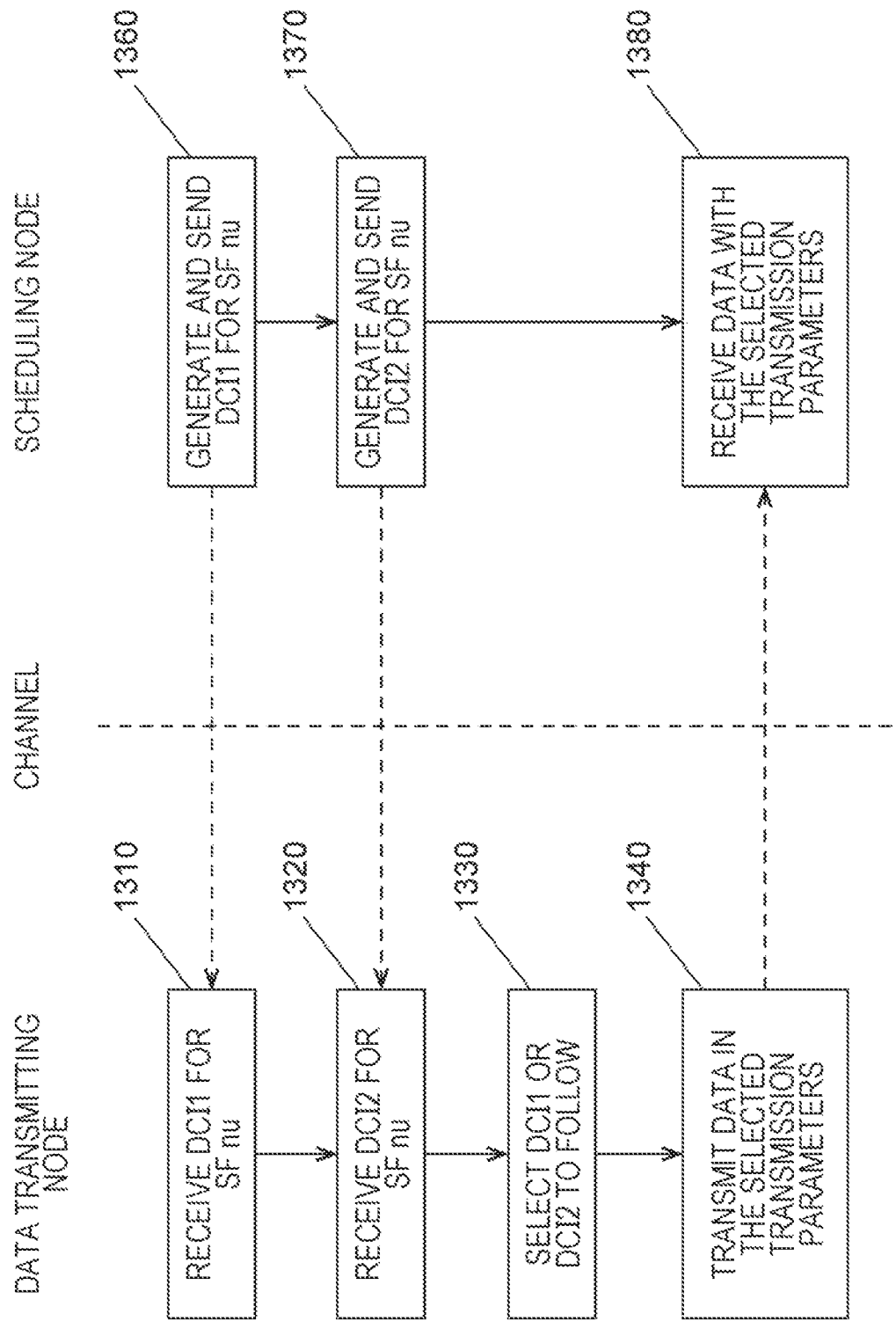

CONFLICT HANDLING OF MULTIPLE DCI

BACKGROUND

1. Technical Field

The present disclosure relates to shared channel resource allocation and in particular to data receiving and transmitting apparatuses and methods for reception and transmission of data on a shared channel.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs). The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipment, the SGW terminates the downlink data path and triggers paging when downlink data arrives for the user equipment. It manages and stores user equipment contexts, e.g. parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipment. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipment.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} \times N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $$N_{RB}^{min,DL} \leq N_{RB}^{DL} \leq N_{RB}^{max,DL},$$

where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$. For the uplink, a grid shown in FIG. 2 is provided; reference is also made in this respect to FIGS. 6.2.2-1 and 5.2.1-1 in 3GPP TS 36.211, v. 13.2.0.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 2 (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, (for instance version v8.9.0, available at http://www.3gpp.org).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The bandwidth that the LTE-Advanced system is able to support is 100 MHz, while an LTE system can only support 20 MHz. In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. A user equipment may simultaneously receive or transmit on one or multiple component carriers (corresponding to multiple serving cells) depending on its capabilities. Carrier aggregation is supported for both contiguous and non-contiguous component carriers with each component carrier limited to a maximum of 110 Resource Blocks in the frequency domain (using the 3GPP LTE (Release 8/9) numerology).

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

Uplink Access scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNode B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size BWgrant during one time interval, e.g. a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format and other transmission-related information (e.g. HARQ information, transmit power control (TPC) commands), L1 /L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one sub-frame.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e. conveys L1/L2 control signaling, even though the detailed transmission methods are different from the PDCCH. Further details can be found particularly in the current versions of 3GPP TS 36.211 (e.g. version v13.2.0) and 3GPP TS 36.213, "Physical Layer Procedures", v13.2.0, available free of charge at www.3gpp.org. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:
  User identity, indicating the user that is allocated. This is typically included in the checksum by masking the CRC with the user identity;
  Resource allocation information, indicating the resources (e.g. Resource Blocks, RBs) on which a user is allocated. This information is also termed resource block assignment (RBA). Note, that the number of RBs on which a user is allocated can be dynamic;
  Carrier indicator, which is used if a control channel transmitted on a first carrier assigns resources that concern a second carrier, i.e. resources on a second carrier or resources related to a second carrier; (cross carrier scheduling);
  Modulation and coding scheme that determines the employed modulation scheme and coding rate;
  HARQ information, such as a new data indicator (NDI) and/or a redundancy version (RV) that is particularly useful in retransmissions of data packets or parts thereof;
  Power control commands to adjust the transmit power of the assigned uplink data or control information transmission;
  Reference signal information such as the applied cyclic shift and/or orthogonal cover code index, which are to be employed for transmission or reception of reference signals related to the assignment;
  Uplink or downlink assignment index that is used to identify an order of assignments, which is particularly useful in TDD systems;
  Hopping information, e.g. an indication whether and how to apply resource hopping in order to increase the frequency diversity;
  CSI request, which is used to trigger the transmission of channel state information in an assigned resource; and
  Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

In the current LTE specification (Rel-13), the modulation and coding scheme (MCS) is determined by the parameters modulation order, transport block size (TBS) and number of resource elements (REs) that are used for the transport block transmission.

Supported modulation orders (number of bits per modulation symbol) for LTE in licensed bands comprise 2, 4, 6 and 8; corresponding to QPSK, 16QAM, 64QAM and 256QAM, respectively. Whether all of them will be supported for unlicensed band operation as well has not been discussed so far, but it is advantageous if the same set of modulation order will be supported for unlicensed band operation as well.

The TBS is determined by the TBS index by means of the MCS index that is indicated to the UE within the DCI and the number of PRBs that are allocated for the PDSCH transmission as described in Section 7.1.7 of 3GPP TS 36.213, v13.2.0, titled "Evolved Universal Terrestrial Radio Access (E-UTRA); Physical layer procedures", available at www.3gpp.org. The LTE specification TS 36.213 contains two-dimensional TBS tables in Section 7.1.7.2 of which the TBS index and number of scheduled PBRs indicates row and column, respectively. The table specifies the transport block sizes and thus, the coding and puncturing applicable.

FIG. 5 shows an uplink MCS table which assigns each of the 32 values 0-31 an MCS and/or a redundancy version. In particular, the first column represents an MCS index, which is included in the DCI. Each MCS index 0-28 is associated with a particular combination a of the modulation order (2=QPSK, 4=16QAM, 6=64QAM) and the Transport Block Size (TBS) Index as well as redundancy version index. The MCS indices (values) 29-31 are not associated with a particular modulation (order) or coding scheme (TBS index) in the uplink, but rather define the redundancy versions 1-3, while it is assumed that the modulation and coding scheme remains as it was in a preceding transmission (e.g. with redundancy version 0) of the same transport block, A Redundancy Version (RV) specifies a starting point in a circular (re)transmission buffer to start reading operation. Usually RV=0 is selected for the initial transmission to send mainly systematic bits, since this approach has shown a good compromise between successful decoding at high Signal-to-Noise ratios (SNRs) and at low SNRs. The scheduler can choose different RVs on transmissions of the same packet to support both incremental redundancy and Chase combining. There are four redundancy versions currently defined, characterized by their starting positions, and numbered from 0 to 3. The usual sequence of these RVs for the first transmission and the subsequent retransmission is 0, 2, 3, 1.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.2.0, available at http://www.3gpp.org). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3.

Format 0: DCI format 0 is used for the transmission of resource grants for the PUSCH, using single-antenna port transmissions in uplink transmission mode 1 or 2, Format 1: DCI format 1 is used for the transmission of resource assignments for single codeword PDSCH transmissions (downlink transmission modes 1, 2 and 7).

Format 1A: DCI format 1A is used for compact signaling of resource assignments for single codeword PDSCH transmissions, and for allocating a dedicated preamble signature to a mobile terminal for contention-free random access (for all transmissions modes).

Format 1B: DCI format 1B is used for compact signaling of resource assignments for PDSCH transmissions using closed loop preceding with rank-1 transmission (downlink transmission mode 6). The information transmitted is the same as in Format 1A, but with the addition of an indicator of the precoding vector applied for the PDSCH transmission.

Format 10: DCI format 1C is used for very compact transmission of PDSCH assignments. When format 1C is used, the PDSCH transmission is constrained to using QPSK modulation. This is used, for example, for signaling paging messages and broadcast system information messages.

Format 1D: DCI format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI format 2 is used for the transmission of resource assignments for PDSCH for closed-loop MIMO operation (transmission mode 4).

Format 2A: DCI format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: Introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The PDCCH carries DCI on an aggregation of one or a plurality of consecutive control channel elements (CCEs). A control channel element corresponds to 9 resource element groups (REG) of which each consists of four or six resource elements.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC.

A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

While traditional wireless communications (Single-Input Single-Output (SISO)) exploit time- or frequency-domain pre-processing and decoding of the transmitted and received data respectively, the use of additional antenna elements at either the base station (eNodeB) or User Equipment (UE) side (on the downlink or uplink) opens an extra spatial dimension to signal preceding and detection. Space-time processing methods exploit this dimension with the aim of improving the link's performance in terms of one or more possible metrics, such as the error rate, communication data rate, coverage area and spectral efficiency (expressed in bps/Hz/cell). Depending on the availability of multiple antennas at the transmitter and/or the receiver, such techniques are classified as Single-Input Multiple-Output (SIMM), Multiple-Input Single-Output (MISO) or MIMO. While a point-to-point multiple-antenna link between a base station and one UE is referred to as Single-User MIMO (SU-MIMO), Multi-User MIMO (MU-MIMO) features several UEs communicating simultaneously with a common base station using the same frequency- and time-domain resources.

The LTE standard defines what is known as antenna ports (cf. TS 36.211, v13.2.0, Section 5.2.1). The antenna ports do not correspond to physical antennas, but rather are logical entities distinguished by their reference signal sequences. Multiple antenna port signals can be transmitted on a single transmit antenna. Correspondingly, a single antenna port can be spread across multiple transmit antennas.

A spatial layer is the term used in LTE for one of the different streams generated by spatial multiplexing. A layer can be described as a mapping of symbols onto the transmit antenna ports. Each layer is identified by a preceding vector of size equal to the number of transmit antenna ports and can be associated with a radiation pattern. The rank of the transmission is the number of layers transmitted.

A codeword is an independently encoded data block, corresponding to a single Transport Block (TB) delivered from the Medium Access Control (MAC) layer in the transmitter to the physical layer, and protected with a CRC. For ranks greater than 1, two codewords can be transmitted. The number of codewords is always less than or equal to the number of layers, which in turn is always less than or equal to the number of antenna ports. It is possible to map Transport Block 1 to Codeword 0 and Transport Block 2 to Codeword 1, or alternatively to map Transport Block 2 to Codeword 0 and Transport Block 1 to Codeword 1.

In order to enable fast rank and precoder adaptation for a downlink transmission mode, it is possible to configure the UE to feed back a Rank Indicator (RI) together with a Precoding Matrix Indicator (PMI) which indicate the preferred RI/PMI based on the measured quality. On the other hand, the eNB indicates via a Transmitted Precoding Matrix Indicator (TPMI) in the downlink assignment message on the PDCCH whether it is applying the UE's preferred precoder, and if not, which precoder is used. This enables the UE to derive the correct phase reference relative to the cell-specific RSs in order to demodulate the PDSCH data.

Similarly, the eNB is able to control the rank and precoder for an uplink transmission mode. In contrast to downlink, there is no explicit feedback by the UE such as RI and PMI. The eNB rather can take the transmitted reference symbols from an uplink transmission (such as the demodulation reference symbols or sounding reference symbols) and use these to determine an appropriate number of transmitted layers and TPMI, which is then indicated in the uplink resource assignment message (DCI) transmitted on a control channel such as the PDCCH.

LTE on Unlicensed Bands—Licensed-Assisted Access LAA

A work item addressing the specification of LTE for unlicensed band operation was initiated in June 2015. The reason for extending LTE to unlicensed bands is the ever-growing demand for wireless broadband data in conjunction with the limited amount of licensed bands. Unlicensed spectrum therefore is more and more considered by cellular operators as a complementary tool augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation in unlicensed bands will therefore at least in the beginning be considered rather a complement to LTE on licensed spectrum than stand-alone operation in unlicensed spectrum. Based on this assumption, 3GPP established the term Licensed Assisted Access (LAA) for the LTE operation in unlicensed bands in conjunction with at least one licensed band. Future stand-alone operation of LTE in unlicensed spectrum without relying on LAA is however not excluded.

The current general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same carrier) and cross-carrier scheduling between cells (scheduling information in terms of PDCCH/EPDCCH and user data in terms of PDSCH/PUSCH are transmitted on different carriers).

The basic envisioned approach at 3GPP is that the PCell will be operated on a licensed band while one or more SCells will be operated in unlicensed bands. The benefit of this strategy is that the PCell can be used for reliable transmission of control messages and user data with high quality of service (QoS) demands, such as for example voice and video, while a PCell in unlicensed spectrum might yield, depending on the scenario, to some extent significant QoS reduction due to inevitable coexistence with other RATs. A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the drawing.

It has been agreed at 3GPP, that the LAA investigation and specification will focus in the first step on unlicensed bands at 5 GHz. One of the most critical issues is therefore the coexistence with Wi-Fi (IEEE 802.11) systems operating in these unlicensed bands. In order to support fair coexistence between LTE and other technologies such as Wi-Fi as well as fairness between different LTE operators in the same unlicensed band, the channel access procedures of LTE for unlicensed band operation has to abide by certain sets of regulatory rules which depend on region (Europe, US, China, Japan, etc.) and considered frequency band. A comprehensive description of the regulatory requirements for operation in unlicensed bands at 5 GHz is given in 3GPP TR 36.889, v13.0.0 of June 2015, titled "Study on Licensed-Assisted Access to Unlicensed Spectrum", available at www.3gpp.org. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

The DFS operation and corresponding requirements are associated with a master-slave principle. The master shall detect radar interference, can however rely on another device, that is associated with the master, to implement the radar detection. Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

The energy detection for the CCA is performed over the whole channel bandwidth (e.g. 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment occupies a given unlicensed channel by means of continuous transmission without re-evaluating the availability of that channel (i.e. LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be e.g. 4 ms as currently defined for Japan. There is furthermore a minimum Idle time during which the equipment is not allowed to occupy the unlicensed channel again after a transmission on that unlicensed channel, the minimum Idle time being at least 5% of the preceding Channel Occupancy Time. At the end of the Idle Period, the UE can perform a new CCA, and so on. This transmission behavior is schematically illustrated in FIG. 4.

Multiple Subframe Allocation

There has been a discussion in 3GPP RAN1 concerning the possibility of multi-subframe scheduling for the uplink LAA (cf. 3GPP RAN1 contribution R1-160557 titled "Discussion on multi-subframe scheduling for UL LAA", Meeting #84 in Malta, February 2016). Accordingly, with the exception of semi-persistent scheduling (SPS) and UL grants in TDD UL/DL configuration 0, only per-TTI scheduling is allowed. Downlink or uplink grant received in subframe n schedules only one PDSCH or PUSCH for a subframe n+k, where k=0 and 4 for downlink and uplink respectively, in FDD case.

Based on FDD HARQ timing, upon reception of the UL grant in subframe n, the scheduled LAA UE(s) would require to perform LBT on the scheduled unlicensed carrier to occupy the channel before the start of PUSCH transmission in the subframe n+4. The eNB cannot predict LBT result at UE side when the UL grant is sent in subframe n, the eNB has no choice but to send the UL grant with the expectation that UEs would occupy the channel for the scheduled PUSCH in subframe n+4. However, if UE cannot complete the required LBT for uplink transmission on time, the scheduled PUSCH cannot be transmitted in the scheduled subframe, which results in not only the waste resources for UL grants but also the waste UL resource for PUSCH transmission. LAA UL transmission should be designed to increase channel access opportunity of LAA with less scheduling overhead.

To increase channel access opportunity while minimizing signaling overhead to schedule PUSCH on unlicensed carrier, multi-subframe scheduling is provided. A multi-subframe scheduling allows UE to transmit PUSCH in one or multiple subframes in the scheduled subframes whenever UEs pass the LBT by one UL grant. In case of demands on DL is low but that for UL is high, it is beneficial to support multi-subframe scheduling to avoid unnecessary DL transmission to send UL grant. In this case, it would not only save the signaling overhead for sending UL grant but also reduce the overall unlicensed channel occupancy time, which is beneficial for a fair coexistence with other unlicensed carrier communication nodes or systems.

For uplink transmissions on an unlicensed carrier, the eNB has the choice between up to four DCI formats 0A/0B/4A/4B, where in addition each of these can constitute a single-stage grant or a triggered (=two-stage) grant.

Each of the DCI formats contains a 'scheduling delay' field that indicates an additional scheduling offset between 0 and 15 subframes in case of single-stage grants, and for triggered grants between 0 and 3 subframes in the first stage DCI of a triggered grant with an additional offset of {1;2;3;4;6} subframes indicated by the second stage of a triggered grant—resulting in an additional scheduling offset between 0 and 9 subframes after the reception of the second stage of a triggered grant.

Regardless whether resources are granted by means of a single-stage grant or a triggered grant, the ability to indicate one out of a plurality of scheduling offsets in any of these grants implies that DCI transmitted in different subframes n1 and n2 are able to schedule PUSCH transmissions in the same uplink subframe nu. The current specification does not specify any UE behavior for such a conflict of granted resources.

SUMMARY

If the UE behavior is unspecified, this may cause misalignments between the eNB and the UE and thus lead to delays and resource wasting.

One non-limiting and exemplary embodiment provides an approach improving the resource usage in connection with transmission or reception grant signaling.

This is achieved by the features of the independent claims.

Advantageous embodiments are subject matter of the dependent claims.

In an embodiment, the techniques disclosed here feature data transmitting device that is provided for transmitting data to a data receiving node over a wireless channel in a communication system, the data transmitting device comprising: grant receiving circuitry for receiving a first resource grant for a data transmission in a subframe and a second resource grant for a data transmission of data in said subframe; and transmission control circuitry for selecting according to which of the first resource grant and the second resource grant data are to be transmitted in the subframe; and a transmitter for transmitting the data in the subframe according to the selected first grant or second grant.

It should be noted that general or specific embodiments may be implemented as a signal, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

FIG. 12 is a block diagram illustrating methods for handling situations in which for one subframes more than one different grants are received.

DETAILED DESCRIPTION

Figure 1:
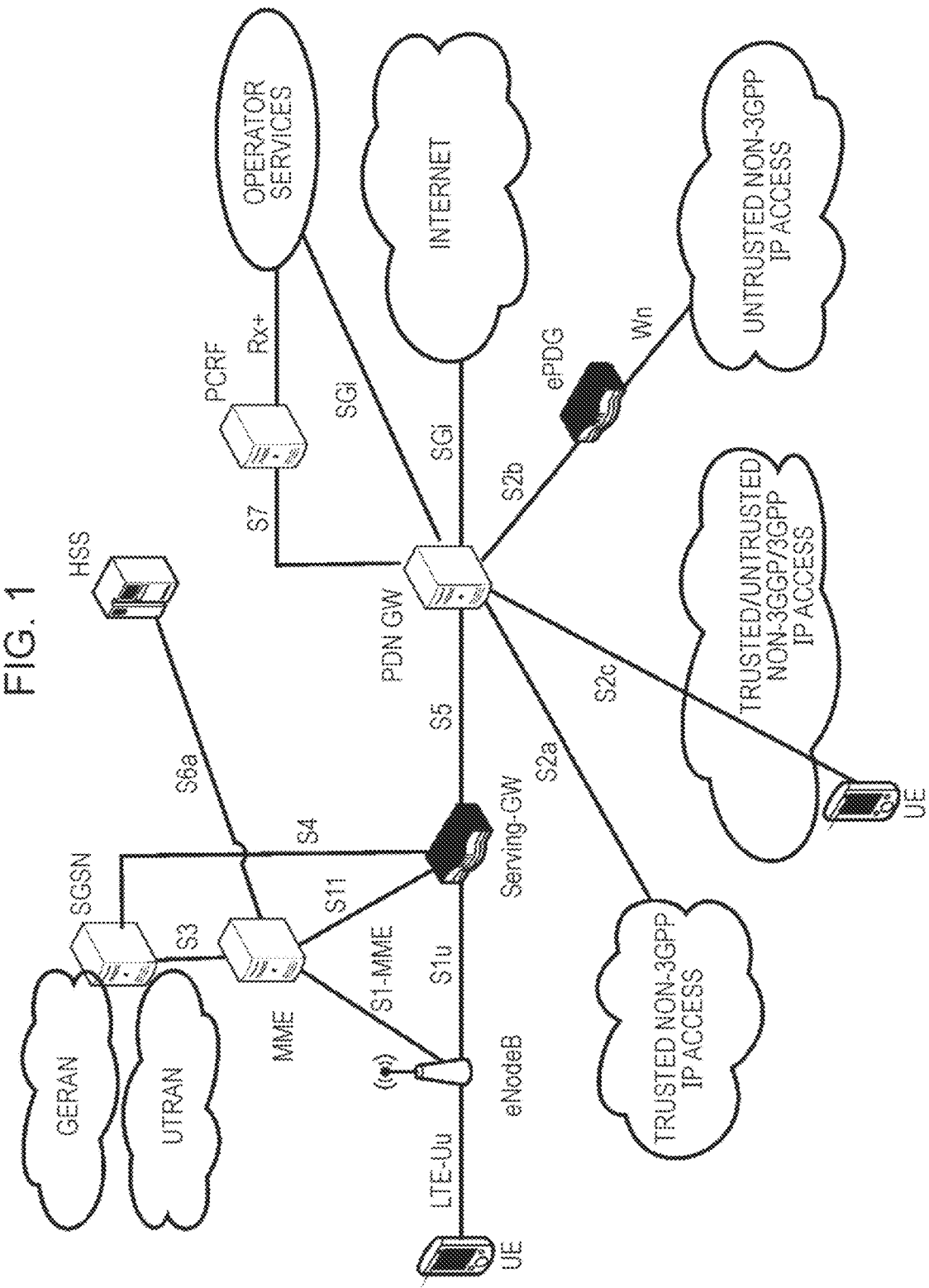
FIG. 1 shows an exemplary architecture of a 3GPP LTE system.
Figure 2:
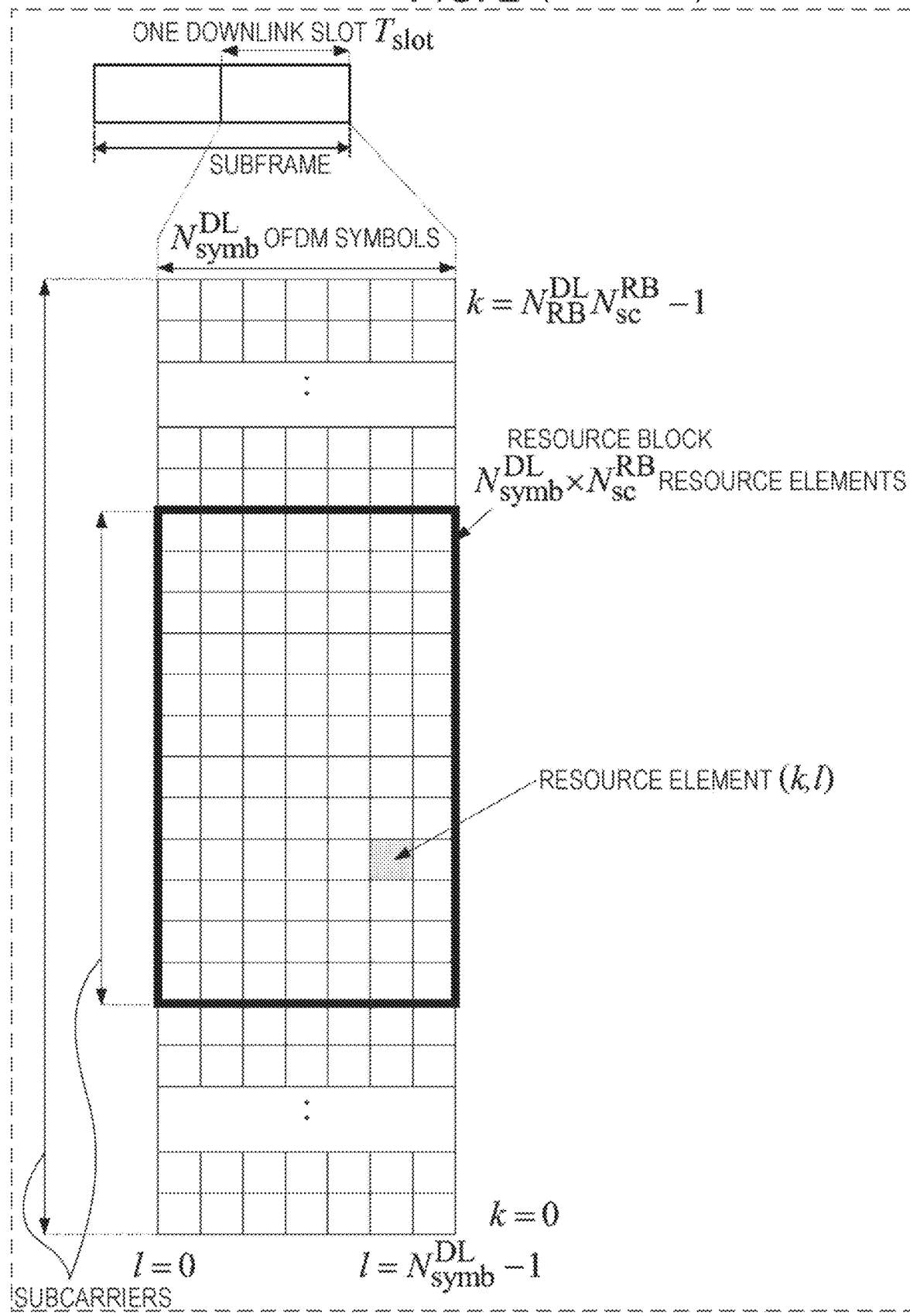
FIG. 2 shows an exemplary downlink resource grid of a downlink slot of a subframe as defined for 3GPP LTE (Release 8/9)
Figure 3:
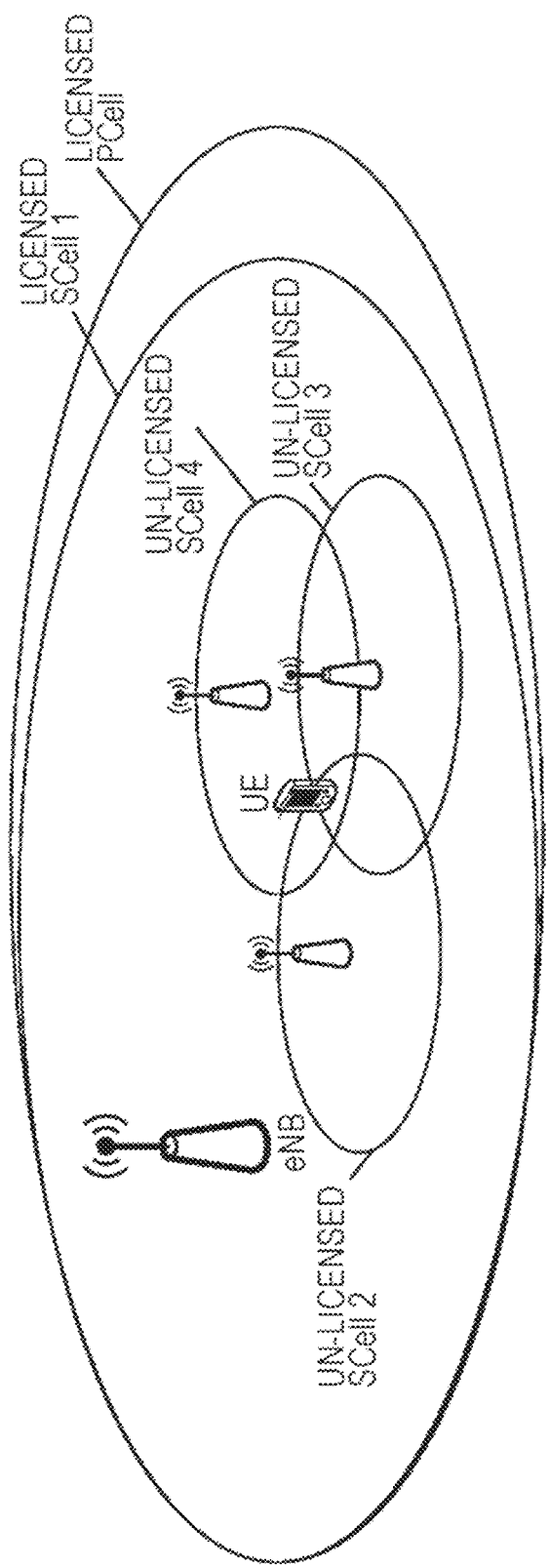
FIG. 3 illustrates an exemplary licensed-assisted access scenario, with various licensed and unlicensed cells.
Figure 4:
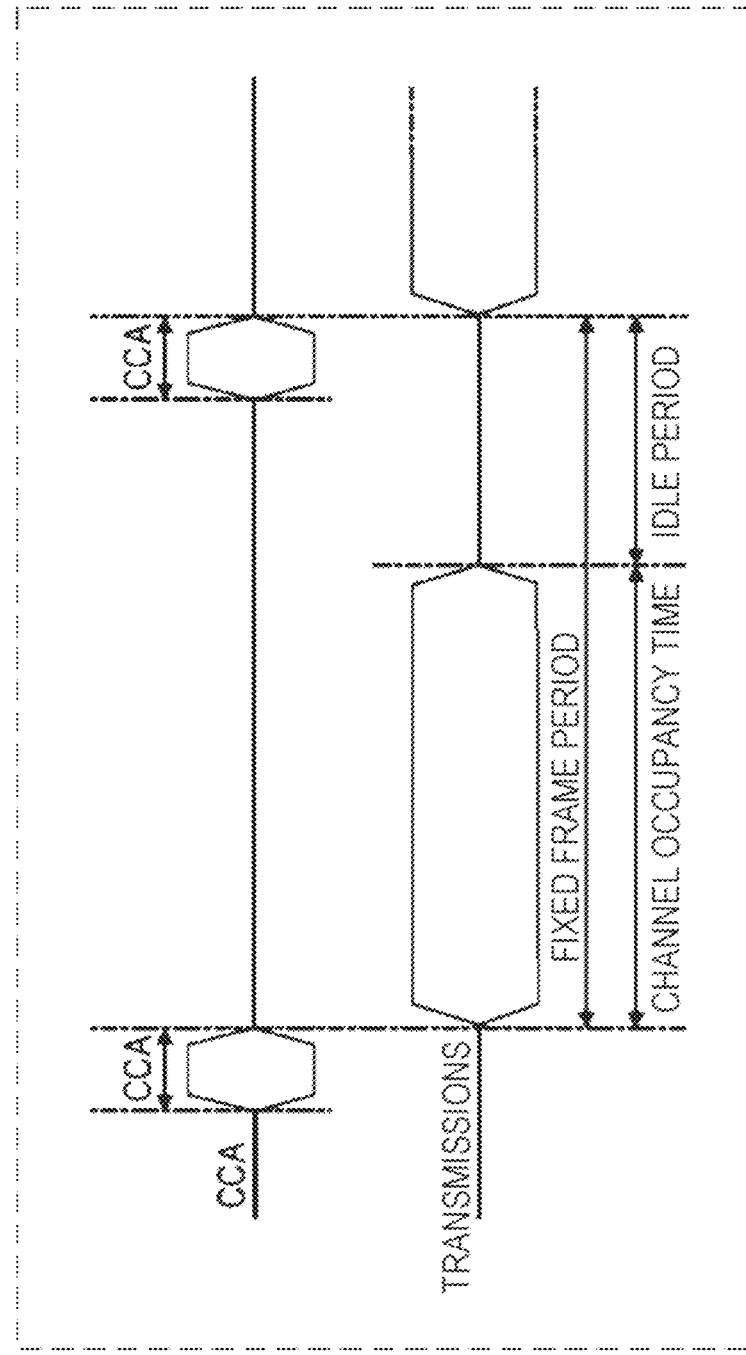
FIG. 4 illustrates schematically the transmission timing on an unlicensed band, including the different periods, Channel Occupancy Time, Idle Period, and Fixed Frame Period.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources and/or space or code resources.

The term "unlicensed cell" or alternatively "unlicensed carrier" as used in the set of claims and in the application is to be understood broadly as a cell/carrier in an unlicensed frequency band. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

A transport block (TB) that will be transmitted in a physical downlink shared channel (PDSCH) or physical uplink shared channel (PUSCH) has to be prepared prior to the transmission of the PDSCH or PUSCH itself. A certain number of bits, given by the transport block size (TBS), are taken from a specific HARQ process queue of the MAC layer and passed down to the PHY (physical layer) together with a corresponding MAC header.

As explained above, a single uplink transmission grant may allocate resources either in a single-subframe or in multiple subframes. In LTE, DCI format 0A is for allocating resources in a single subframe and for a single antenna port while DCI format 0B allocates resources in one or multiple subframes for a single antenna port. For multiple antenna ports (MIMO, SISO), DCI format 4A reserves a single subframe, whereas DCI format 4B reserves one or multiple subframes.

In particular, currently in 3GPP it is agreed that DCI format 0B/4B indicates the number of scheduled subframes, HARQ process IDs for the scheduled subframes by indicating HARQ process ID for the first scheduled subframe, and HARQ process IDs for other subframes are derived therefrom by a given rule. In particular, the HARQ process IDs for other subframes are consecutive with the indicated HARQ process IDs, modulo the maximum number of HARQ processes. The DCI format 0B/4B further indicates RVs for the scheduled subframes by indicating a 1-bit RV value per scheduled subframe (regardless of the number of scheduled transport blocks in each subframe), and can indicate RV 0 or 2.

Each of these four DCI formats may also include a field for indicating a scheduling delay. The scheduling delay specifies by how many subframes the transmission scheduled by the same DCI is to be postponed. In the LTE, as described in the background section the scheduling delay field enables signaling of up to 16 delay values. These values specify offset with respect to a predefined minimum number of subframes. In particular, in LTE up to Release 13, the transmission scheduled by a DCI occurs always at least four subframes after reception of said DCI. This provides for processing time to the transmitting node which is in uplink the UE. For instance, when a DCI is received in a subframe n, then scheduling delay values 0 to 15 specify that the transmission is to take place in one of the respective subframes n+4 to n+19. Thus, the transmission may be postponed by up to 15 additional subframes. In general, for the advanced systems after LTE such as NR, the predetermined delay may be lower than 4 or even zero so that the scheduling delay may directly indicate the offset between reception of the grant and the data transmission.

Employment of the scheduling delay is one of reasons that the scheduling node may transmit different grants for the same subframe resource. For instance, a grant with a scheduling delay may be transmitted at first and later another grant for the same subframe may be transmitted with a smaller or no scheduling delay. Such situations may be advantageous for the scheduling node for instance if it is erroneously believed that the first grant has not been received. However, such behavior may also be advantageous in other situations such as scheduling for multiple subframes.

In general, the following conflicts between different grants for the same subframe may occur in an uplink subframe nu:
  A single subframe (SSF) grant is transmitted in a subframe n1 and another SSF grant is transmitted in subframe n2.
  A SSF grant is transmitted in subframe n1 and a multiple subframe (MSF) grant is transmitted in subframe n2.
  An MSF grant transmitted in subframe n1 and an SSF grant is transmitted in subframe n2.
  An MSF grant is transmitted in subframe n1 and another MSF grant is transmitted in subframe n2.
In the context of LTE, n1 differs from n2 and this will also be the case for other systems with a shared channel. However, in general, n1 equal to n2 could also occur especially if there are multiple scheduling entities or grants transmitted on different resources at the same time.

Current LTE system does not specify the terminal behavior in uplink upon reception of two different grants for subframe nu. Thus, it is unclear, how the terminal is to react in subframe nu and nu+1 etc.

Without loss of generality, we assume that there is a difference in at least one transmission-related parameter indicated by the DCIs for subframe nu. The special case of identical information in all transmission-related parameters can also be solved by one of the presented embodiments.

If the behavior of the UE is undefined, the UE is free to do, for instance, any of the following:
  a) Transmit PUSCH in subframe nu according to the DCI received in subframe n1
  b) Transmit PUSCH in subframe nu according to the DCI received in subframe n2
  c) Not transmit any PUSCH in subframe nu if the two received DCIs are inconsistent Due to this uncertainty, an eNB scheduler may advantageously avoid transmitting conflicting grants. Consequently, the scenario of conflicting granted resources would mainly occur due to a false detection of a DCI at any point of time. However, there may be reasons why the eNB might intentionally send a new DCI in subframe n2:
  The channel conditions have changed and the eNB would like to override an earlier DCI.

The earlier DCI was granting multiple subframes and the eNB would like to update e.g. the LBT or starting/ending symbol to changing conditions, or optimize the transmission parameters such as RV or MCS for a single subframe within the plurality of granted subframes.

The eNB would like to extend or shorten the number of granted subframes e.g. in a two-stage grant case after the first stage grant has been transmitted.

In addition, there could even be some uncertainty whether especially a multi-subframe grant should be processed by the UE in subframes after the conflict takes place, i.e. in subframes nu+1 and later.

Two stage grant is a procedure in which a first-stage grant for a UE provides high level information (e.g. RB allocation, MCS etc.) and a second-stage grant by a common control information can schedule (trigger) PUSCH transmissions following MSF or SSE for certain UL subframes. In particular, the first-stage grant is received in a first DCI for a specific UE. The second-stage grant is received with a second DCI possibly addressed commonly to a plurality of UEs. Both DCIs may specify respective scheduling delays, which are summed after reception of the second-stage DCI in order to determine the subframe for transmitting data.

The two-stage grant procedure is further described in Section 8.0 of the 3GPP TS 36.213, v14.0.0 from September 2016, available at www.3gpp.org.

It is noted that the first-stage grant and the second-stage grant do not correspond to the first and second grant mentioned above. Among the first-stage grant and the second-stage grant, it will advantageously be the second-stage grant (in the role of the first and/or the second grant mentioned above) which may cause conflict with possible other grants because it is the second-stage grant which actually triggers the transmission and thus determines the precise subframe location for the data transmission.

When a conflict occurs, according to one example, both conflicting messages are discarded in order to avoid misinterpretations and inappropriate behavior of the receiving node especially in case of erroneous control information reception. Thus, one of possible solution for the conflict of grants for the same subframe is to discard both grants. The effect is that in the subframe nu for which two grants were received no transmission takes place. However, such solution may introduce some further delays in the data transmission which is not compliant with the aims to provide a reduced shared channel transmission delay. Moreover, the missed transmission opportunity also results in wasting or losing resources especially in a shared radio medium such as an unlicensed carrier. For example, if the node does not transmit anything during a subframe that is scheduled by two grants, the effect is that the channel is vacated (i.e. unused) by the node according to this solution, which may lead other contenders of the channel to detect the channel as not busy and thereby bears the risk of other nodes occupying the channel.

Accordingly, the present disclosure defines UE behavior and in particular which of two grants is to be followed in the conflicting subframe and/or later subframes.

It is noted that according to the present disclosure, both grants scheduling conflicting transmissions on the same subframe may be discarded for that subframe. However, if one of the grants is a multi-subframe grant, the subframes following the discarded subframe may be used for the scheduled multi-subframe transmission. This will be explained below in greater detail.

Moreover, even if the description concentrates on two grants received and resulting in transmission conflict in the same subframe, the present disclosure is not limited thereto. There may be more than two grants for the same subframe. Then, similar rules are applicable for selecting which grant to follow as in the case of two grants.

According to an embodiment, there is a conflict caused by two grants one of which is a single subframe grant and the other one of which is a multi-subframe grant. If the data transmitting node receives such two grants, it obeys the single subframe grant. This approach has an advantage that the scheduling node is able to override specific single subframes compared to the multi-subframe grant. This may be particularly relevant for triggering for instance aperiodic channel state indication reporting or sounding reference signals.

In the 3GPP standardization, it has been recently agreed for the multi-subframe scheduling that a DCI (0B or 4B) shall be able to trigger Sounding Reference Signals (SRS) and/or Channel State Information (CSI). However, there are fixed rules according to which in one of the multiple subframes the SRS and/or CSI is triggered, which means that the flexibility of triggering the SRS and/or the CSI is limited in comparison with the SSF grants. If it is desired to trigger SRS/CSI in a particular subframe which is not addressable by the MSF DCI, then overriding the MSF by the SSF can allow that.

In particular, the agreements for the MSF DCIS are briefly summarized in the following. For MSF DCI format 4B, the current 2-bit SRS triggering field is utilized. An SRS subframe indication is included indicating the applicable SRS parameter set configuration (which is provided via RRC). For MSF DCI format 0B, existing SRS triggering bit and 1 additional bit are used for SRS triggering and subframe indication. The four states are defined as no triggering, triggering in the first, in the second or in the last subframe. Thus, it is not possible to trigger SRS in two or more of the multiple subframes or the subframes between the second and the last subframes.

The CSI request in DCI format 0B/4B applies to 2nd scheduled subframe if Nmax=2, and otherwise to the penultimate scheduled subframe. Here, Nmax is the configurable maximum number of subframes that can be scheduled by DCI format 0B/4B. Thus, there is no further flexibility for CSI triggering envisaged currently.

However, it is noted that a conflict may also occur as a result of transmission error, i.e. if a DCI is wrongly detected by a UE due to an undetected error.

In this embodiment, according to a first alternative, the data transmitting node obeys the single subframe grant in subframe nu for which this grant has been received. Moreover, it obeys the multiple subframe grant for the subframes following the subframe nu. This approach is illustrated in FIG. 5.

Figure 5:
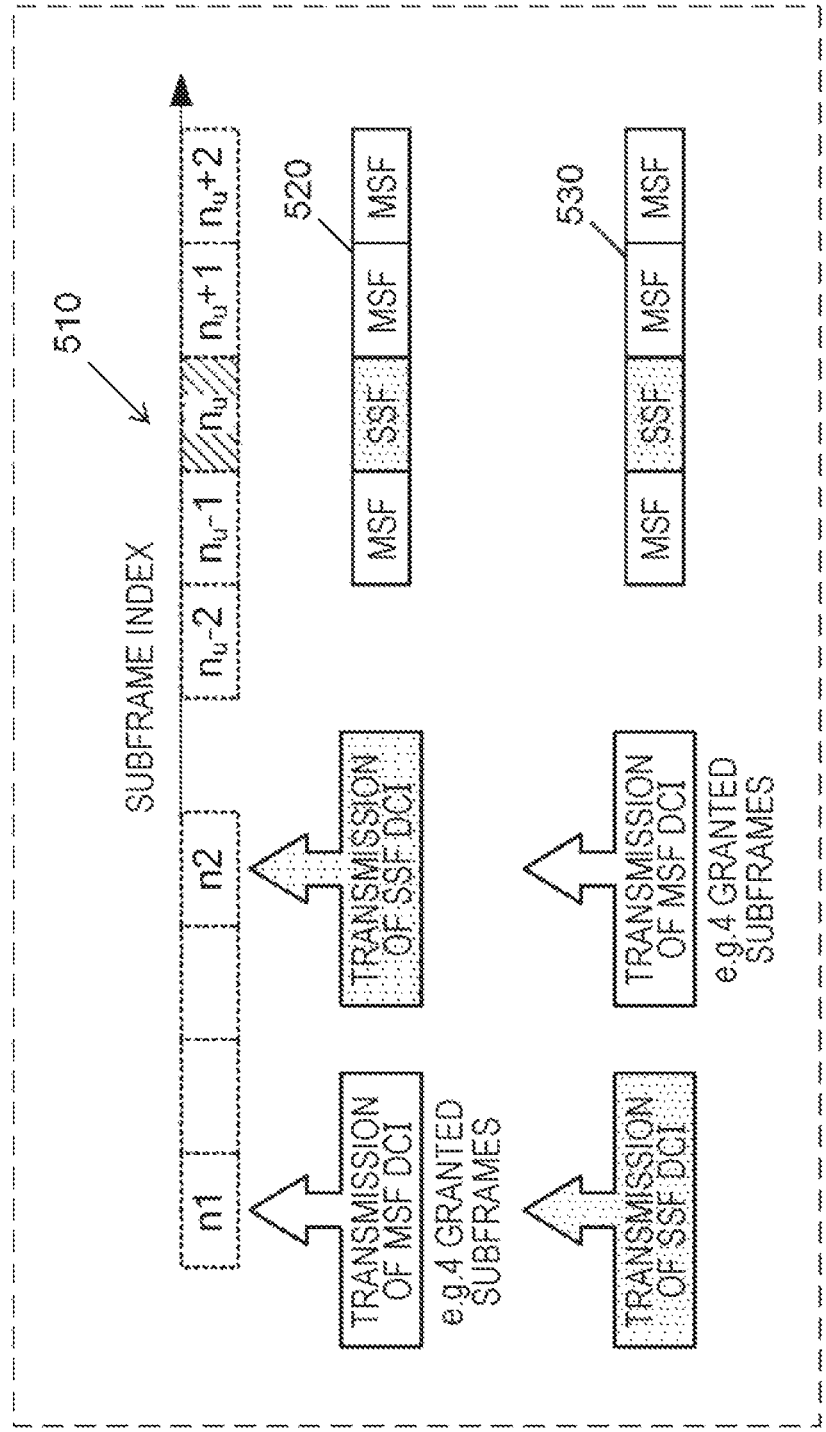
FIG. 5 is a schematic drawing illustrating UE handling based on preference for SSF grant for the conflicting subframe and using the MSF grant otherwise.

FIG. 5 shows on the time axis 510 subframes numbered n1 to n2 and nu−2 to nu+2. In the subframe n1 a multi-subframe DCI is transmitted which grants to the UE resources in four subframes nu−1 to nu+2. Moreover, in subframe n2 a single subframe DCI is transmitted which grants to the same UE resources in subframe nu. Accordingly, there are two grants received by the UE for the subframe nu. The UE behavior in this scenario can be seen for the four granted subframes 520 as follows: in subframe nu−1 the UE will transmit data according to the MSF. In subframe nu in which there is a conflict between the MSF grant and a SSF grant, the SSF grant will be followed. In the subframes nu+1 and nu+2 after the conflicting subframe nu, the MSF grant is followed. It is noted that the term "following" or "obeying" a grant in this context indicate that the transmission parameters indicated in the grant are adopted for transmission of the data. The transmission parameters, as already discussed in the background section, may be one or more of resource block assignment, modulation and coding scheme, carrier indicator, HARQ information, power control commands, reference signal information CSI or SRS trigger, hopping information, multi-cluster information or the like.

The bottom line of FIG. 5 shows a scenario in which in subframe n1 a single subframe DCI is received at the UE and in subframe n2 another, multi-subframe DCI, is received by the same UE. The single subframe DCI includes the resource allocation in subframe nu. The multi-subframe DCI includes the resource allocation for four subframes nu−1 to nu+2, including subframe nu. The behavior of the UE is illustrated for the four subframes 530 as follows: in subframe nu−1 the UE will transmit data according to the MSF. In subframe nu the UE will transmit data according to the SSF. In the remaining subframes nu+1 and nu+2 the UE will transmit data according to the MSF again.

This approach provides the advantage of keeping the overhead low in case the scheduling node (eNodeB) wants to override only a single subframe within a multi-subframe grant since the rest of MSF is followed.

Figure 6:
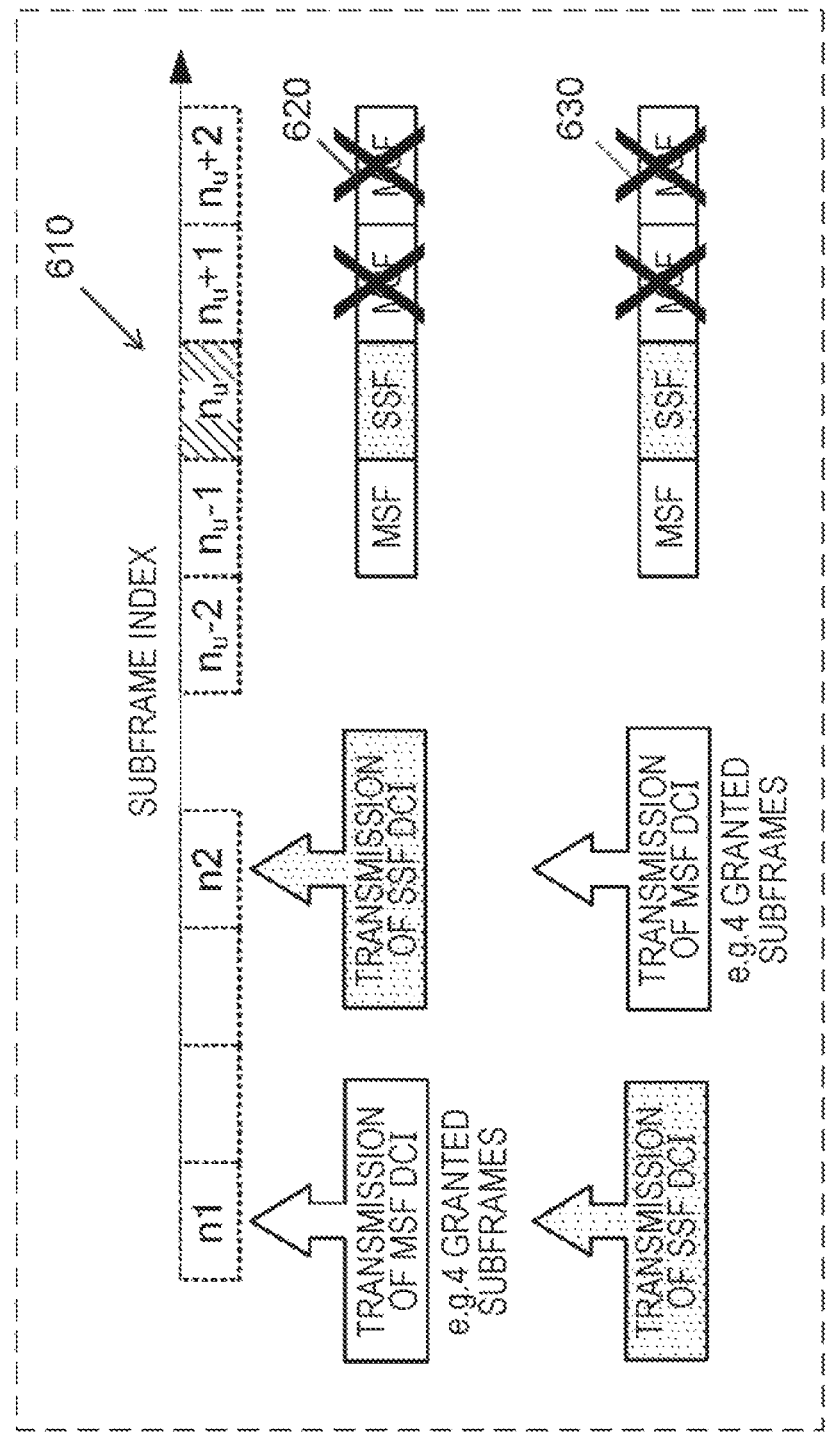
FIG. 6 is a schematic drawing illustrating UE handling based on preference for SSF grant for the conflicting subframe.

On the other hand, there may be scenarios in which it is beneficial to follow only the SSF grant and not to resume the MSF grant transmission in the later subframes. Such example is shown in FIG. 6. In particular, FIG. 6 shows time axis 610 with subframe index of the subframes n1 to n2 and nu−2 to nu+2. In subframe n1, an MSF DCI is received by the UE with resource allocation for subframes nu−1 to nu+2. Moreover, in subframe n2, an SSF DCI is received by the same UE for subframe nu already included in the MSF DCI allocation. The UE behavior for the four subframes 620 is as follows. The UE transmits data in subframe nu−1 according to the MSF and in subframe nu according to the SSF. After transmitting the data in the subframe nu, the UE will not resume the transmission in the remaining two subframes nu+1 and nu+2. Accordingly in these two subframes, the UE will not transmit at all. This approach provides the advantage of avoiding excessive uplink transmissions in case that one of the two detected grants is a false alarm which means that there was in fact no grant transmitted for that UE.

The last row of FIG. 6 shows a similar scenario in which an SSF DCI is received in subframe n1 and an MSF DCI is received in subframe n2. The SSF DCI provides resource reservation for subframe nu (for instance by using the scheduling delay field of the DCI) whereas the MSF DCI provides resource reservation for four subframes nu−1 to nu+2. The UE behavior in this case for the four subframes 630 is the same as above: the UE shall transmit data according to the MSF grant in subframe nu−1 and according to the SSF grant in subframe nu. In the remaining subframes nu+1 and nu+2 of the MSF grant, no transmission takes place.

According to another embodiment, upon receiving two grants for the same subframe, the UE follows the grant that has been received later in time. This approach provides an advantage that that the scheduling node can override any later DCI to adapt to a new situation. This is particularly beneficial if an additional start or end gap is necessary for listen-before-talk procedures or if the channel should be kept longer or released earlier than planned and indicated before. It enables the scheduling node to change its early decisions and thus provide more flexibility.

Figure 7:
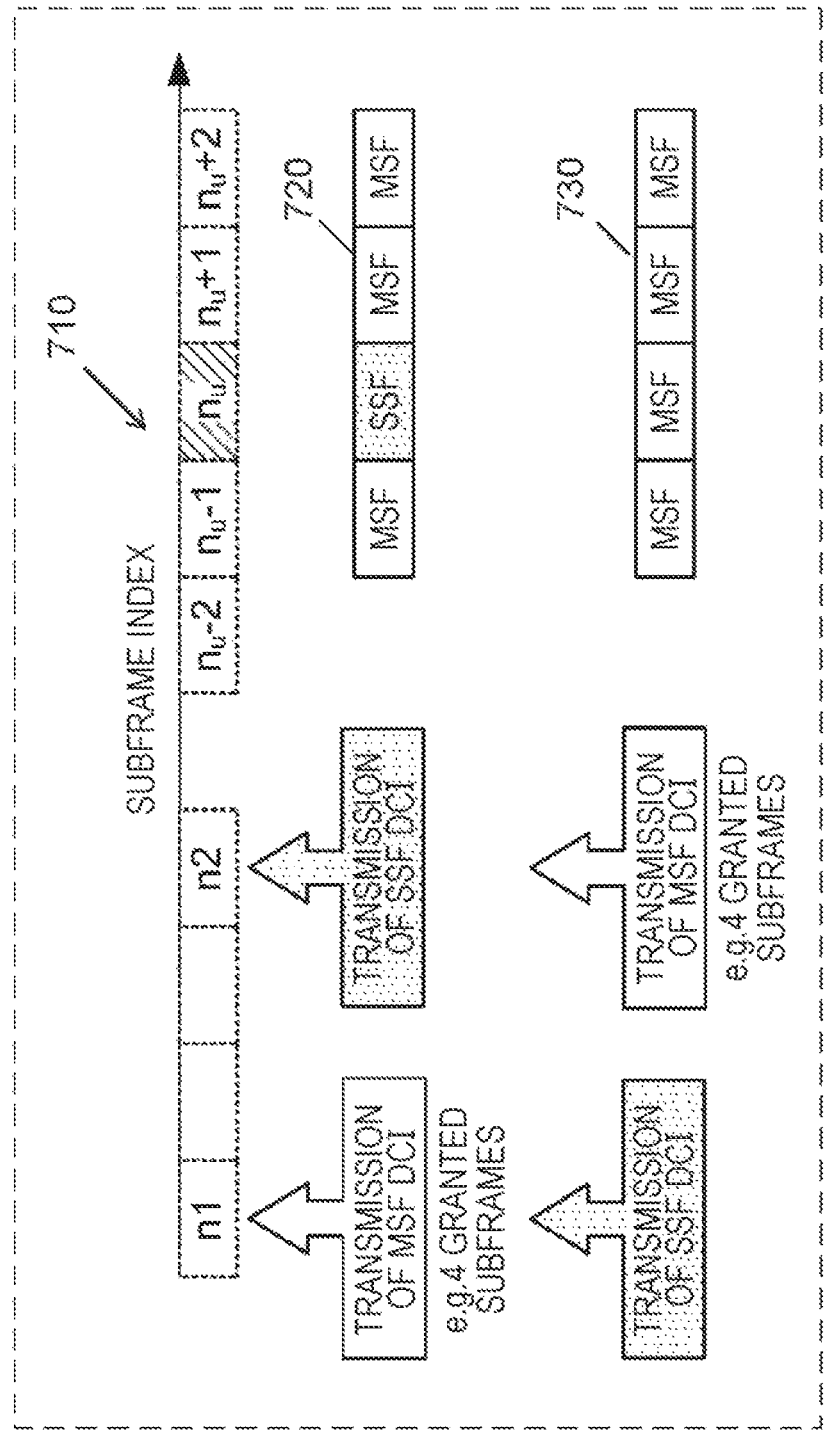
FIG. 7 is a schematic drawing illustrating UE handling based on selection of the most recent grant but allowing transmission according to an earlier MSF for subframes without grant conflicting.

This approach is illustrated in FIG. 7. In this example, the UE transmits data in subframe nu according to the grant received later in time and follows the MSF grant in subframes following subframe nu, if applicable (i.e. if there are subframes allocated by the MSF grant following subframe nu). In particular, FIG. 7 shows a time axis 710 with subframes having index n1 to n2 and nu−2 to nu+2. In subframe n1, the UE receives an MSF DCI with resources allocated in four subframes nu−1 to nu+2. Moreover, in subframe n2 following in time subframe n1, the UE receives an SSF DCI with resources allocated in one subframe nu. The UE will transmit data in the four subframes 720 in the allocated resources as follows: in subframe nu−1 the data are transmitted according to the MSF grant. In subframe nu, the data are transmitted according to the SSF grant since it was received more recently than the MSF grant. The data transmission in subframes nu+1 and nu+2 takes place according to the MSF grant.

The bottom line of FIG. 7 shows another scenario, in which the SSF DCI is received in subframe n1 which is located in time before subframe n2 in which the MSF DCI is received. Both the SSF and the MSF grants overlap since they both allocate resources in the same subframe nu. In this scenario, since the MSF grant is the more recent of the two grants, the entire data transmission in the four subframes nu−1 to nu+2 denoted with reference numeral 730 is performed according to the MSF grant. The approach shown in FIG. 7, according to which the most recent grant is selected, provides the advantage that the most recent grant is followed so that adaption on the recent state of the channel and system is possible and the resources are well utilized since the MSF grant is followed as far as possible.

It is noted that—as is shown in FIG. 7 (as well as FIGS. 5 and 6), subframes n1 and n2 are not necessarily adjacent. Subframes n1 and n2 may be adjacent or there may be any number of subframes in between (any number within the reasonable scheduling delay in which resources for the same subframe may be scheduled, which is basically a system parameter).

Figure 8:
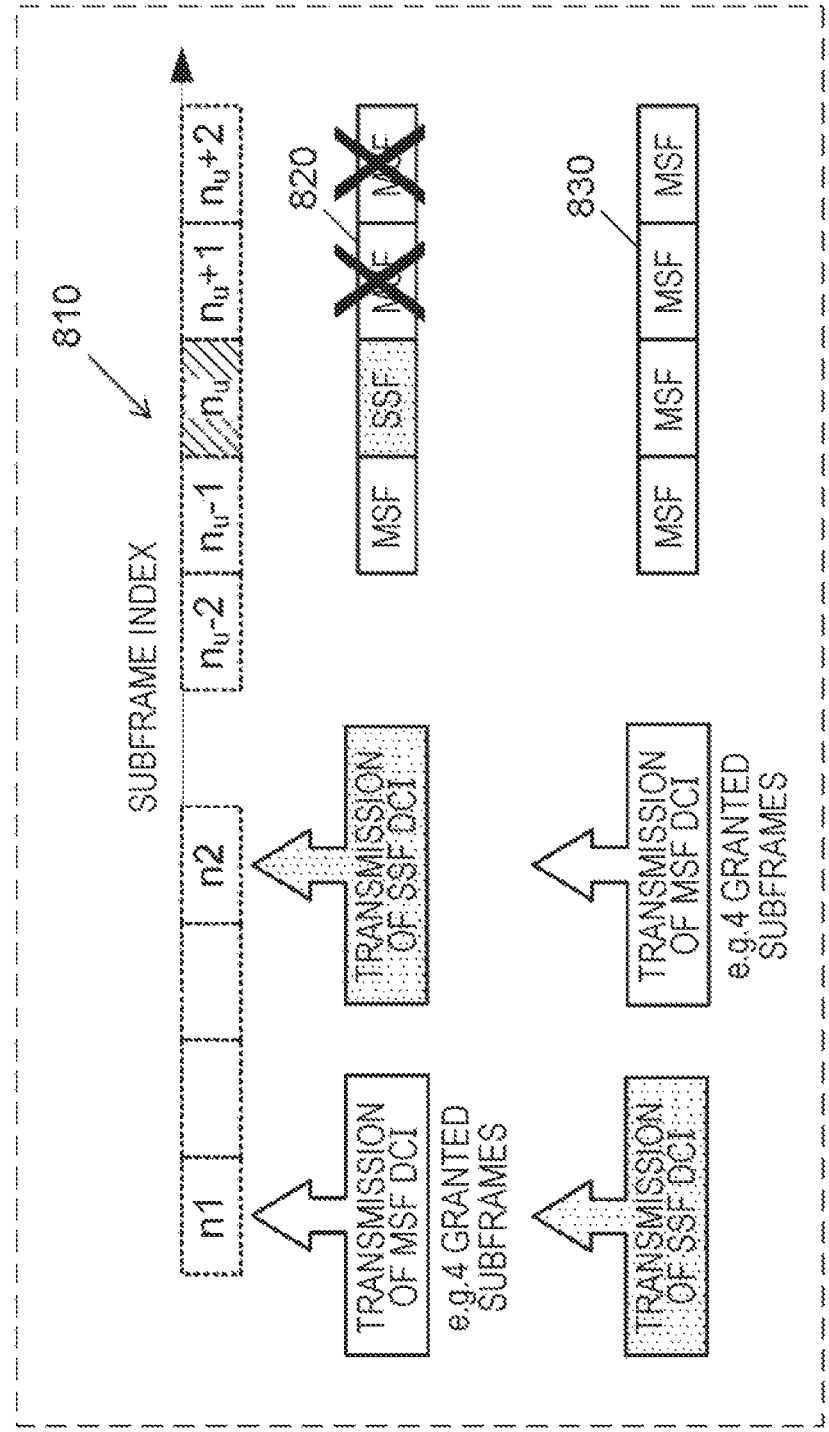
FIG. 8 is a schematic drawing illustrating UE handling based on selection of the most recent grant.

Another alternative embodiment is shown in FIG. 8. FIG. 8 illustrates an approach according to which the UE obeys the later grant in subframe nu and does not resume transmission according to the other grant (overlapping with the later grant) in subframes following subframe nu (if any). In particular, FIG. 8 shows the time axis 810 with subframes having indexes from n1 to n2 and nu−2 to nu+2. According to a first option, an MSF DCI with grant for subframes nu−1 to nu+2 is received in subframe n1. Moreover, an SSF DCI carrying grant for subframe nu is received in subframe n2. The UE behavior in the four subframes 820 allocated by the MSF grant is as follows: Data are transmitted according to the earlier MSF grant in subframe nu−1. In subframe nu, the later received SSF grant is preferred and the data transmission is performed accordingly. After selecting the SSF grant for subframe nu, the transmission in the remaining subframes nu+1 and nu+2 reserved by the MSF grant is not performed.

The bottom line of FIG. 8 shows another scenario, in which the SSF DCI is received before receiving the MSF DCI for transmission of data in the same subframe nu. The behavior of the UE in the four subframes 830 is that the UE transmits data in all four subframes nu−1 to nu+2 for which the MSF grant was received according to the MSF grant, i.e. using the transmission parameters set by the MSF DCI. In this embodiment, in which the most recent grant is to be followed, resources are only unused in the first option, when the SSF is the more recent grant. This approach may be beneficial in cases the MSF was a false alarm corrected by the SSF.

In the present disclosure, in terminology of 3GPP systems, the SSF DCI may be DCI format 0A or 4A, or a DCI format 0B or 4B that reserves transmission resources in just a single subframe, whereas the MSF DCI may be DCI format 0B or 4B that reserves transmission resources in more than one subframe. According to an alternative terminology of 3GPP systems, the SSF DCI may be DCI format 0A or 4A, whereas the MSF DCI may be DCI format 0B or 4B.

It is noted that the present disclosure is not limited to the above described embodiments. In general, the present disclosure provides an approach which avoids discarding all grants which are received for resources in the same subframe. This is achieved by defining a rule which is then applied at the data transmitting side after detecting the conflict.

For instance, it may be advantageous, if two inconsistent DCIs are received with resource allocation for the same subframe nu, not to transmit anything in the subframe nu. Here, the inconsistent DCIS mean two DCIS which differ at least with one transmission parameter, i.e. in the context of LTE indicate different PUSCH parameters. This approach is particularly well applicable if conflicts due to false alarm should be avoided as much as possible.

In other words, a data transmitting device may be provided for transmitting data to a data receiving node over a wireless channel in a communication system, the data transmitting device comprising: grant receiving circuitry for receiving a first resource grant for a data transmission in a subframe and a second resource grant for a data transmission of data in said subframe, the first and the second resource grant differing in at least one transmission parameter. The data transmitting device further comprises transmission control circuitry for judging whether or not at least two resource grants were received for the same subframe and for controlling a transmitter (also part of the data transmitting device) not to transmit data in that subframe.

However, it is noted that in case one of the grants is an MSF grant, the transmission may still take place in the subframes reserved by the MSF and following the conflicting subframe nu. In other words, the transmission control circuitry controls the transmitter to perform transmission in those subframes reserved by the first and/or by the second grant, for which there is no conflict of DCIs, i.e. for which only one transmission parameter set was received.

Figure 9:
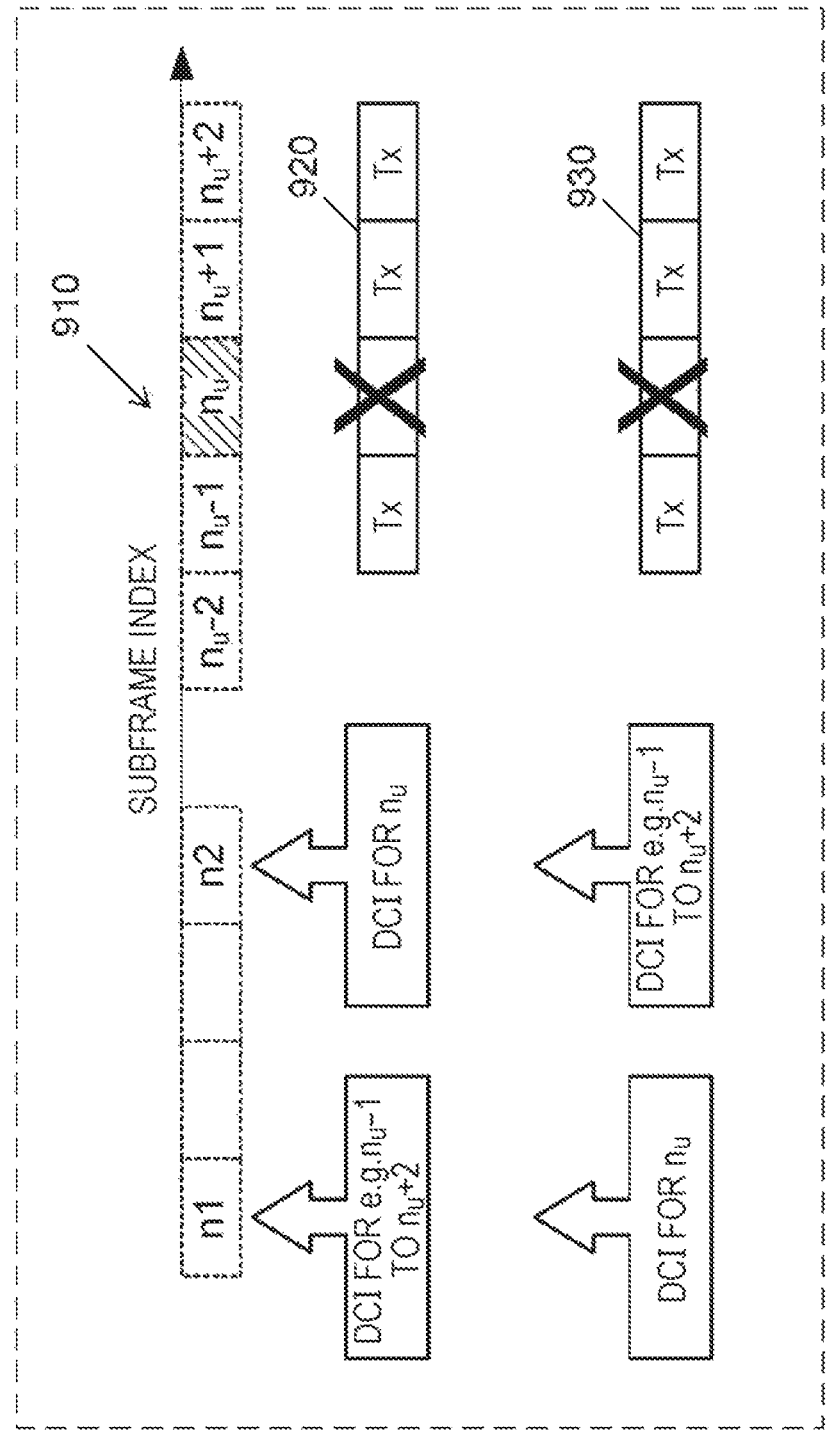
FIG. 9 is a schematic drawing illustrating UE handling when only in the subframe for which different grants were received, no transmission takes place.

This is illustrated in FIG. 9. FIG. 9 shows subframes n1 to n2 and nu−2 to nu+2 in a time domain 910. In subframe n1, a multi-subframe grant is received for subframes nu−1 to nu+2. In subframe n2, an SSF grant is received for subframe nu. In this example, the UE receives the two grants and performs or does not perform transmission in the four subframes 920 as follows: the transmission in subframe nu−2 is performed according to the transmission parameters specified in the MSF grant (received in subframe n1). In subframe nu, no transmission is performed since for this subframe, two different DCIs have been received. However, in the subframes nu+1 and nu+2, the transmission as configured by the MSF DCI is resumed, irrespectively of whether the MSF or the SSF grant arrived later (see transmission in the four subframes 930 in the last row of FIG. 9). In general, the transmission takes place in any subframes for which no inconsistent DCIs have been received, i.e. in subframes for which there is no DCI conflict. Especially in case the transmissions are scheduled for a shared radio medium such as an unlicensed carrier, it may be beneficial to undergo an additional LBT procedure before the transmission in subframe nu+1 is resumed. If there is no transmission occurring in subframe nu, it implies that other contenders for the radio medium may sense the medium as vacant (i.e. not busy) and therefore initiate their own transmissions on the medium. Therefore an LBT procedure before resuming transmissions in subframe nu+1 can avoid potential interference.

In other words, according to an embodiment, the data transmitting device includes a medium sensing unit (circuitry) for sensing whether or not a transmission is taking place in certain resources. Moreover, the transmission control circuitry is configured to instruct the medium sensing unit to perform the sensing when resuming transmission of data according to multiple subframe grant for the subframes following subframe nu, i.e. for the frames following the conflicted subframe. As described above, in subframe nu no transmission takes place, i.e. none of the conflicting grants is followed.

Alternatively, it may be advantageous not to resume transmission according to the MSF since there is a risk that other transmitter sensed in the subframe nu and detected that no transmission occurred and thus is transmitting in subframe nu+1 and/or following subframes. In absence of an additional LBT, this scenario may then lead to collisions between the UE and the other device(s). The other devices may be any devices from the unlicensed band, such as WiFi or the like. Thus, especially in absence of an additional LBT, the UE may advantageously not transmit data in the subframes following the conflicting subframe.

Figure 10:
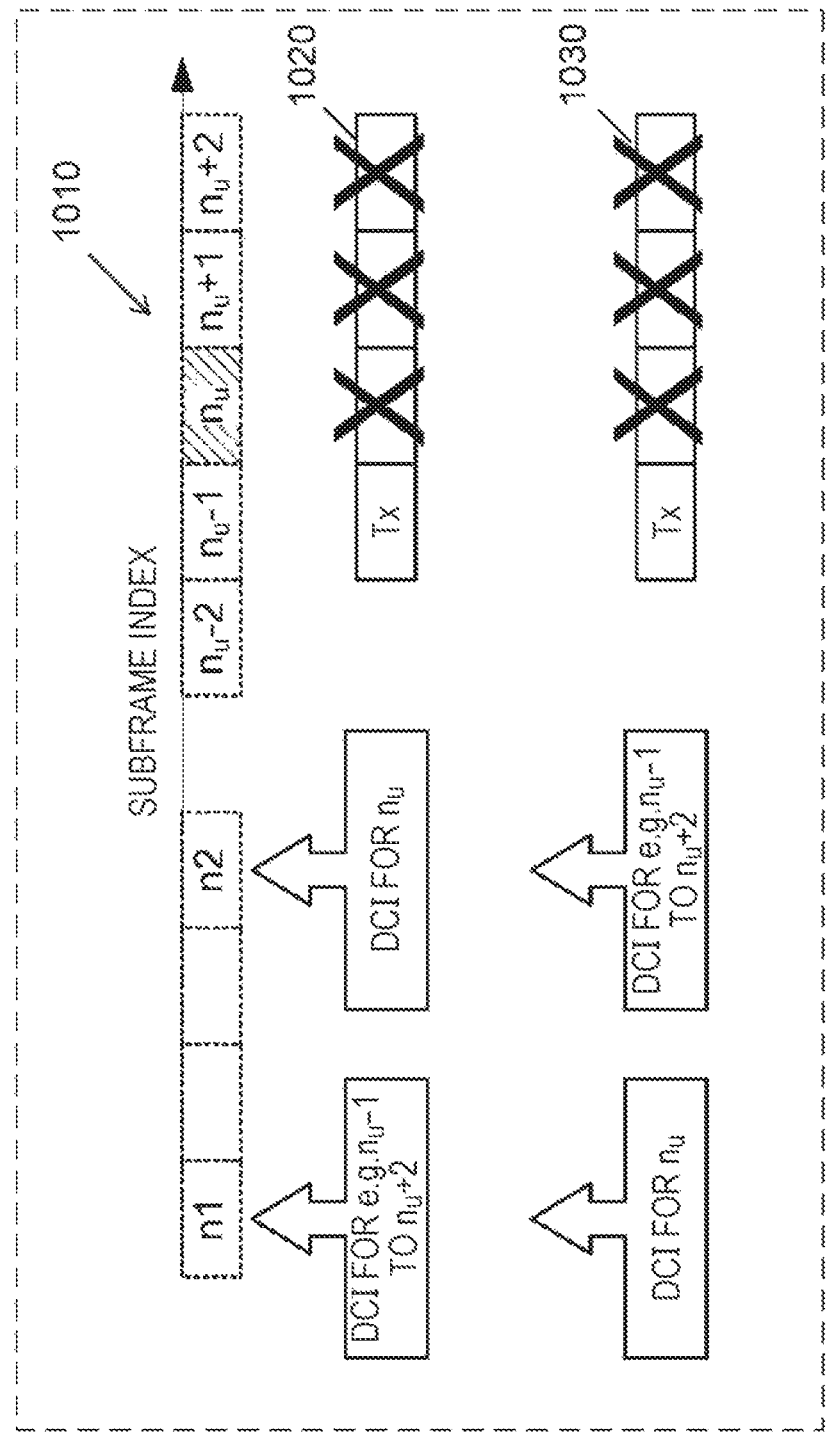
FIG. 10 is a schematic drawing illustrating UE handling when only in the subframe for which different grants were received, no transmission takes place.

FIG. 10 illustrates the case in which the transmission is not resumed. In particular, in subframe n1 out of subframes in the time domain 1010, an MSF grant is received for four frames nu−1 to nu+2. However, out of the four subframes 1020, the transmission takes only place in subframe nu−1, i.e. before subframe nu. In subframe nu, in which the conflict of DCI occurs as well as in the following subframes, no transmission takes place. As can be seen in the bottom line of FIG. 10, the same transmission pattern 1030 is adopted in the case in which the SSF grant is received before the MSF grant. Especially in case the transmissions are scheduled for a shared radio medium such as an unlicensed carrier, it may be beneficial to generally not resume transmissions in subframe nu+1 as mentioned above. If there is no transmission occurring in subframe nu, it implies that other contenders for the radio medium may sense the medium as vacant (i.e. not busy) and therefore initiate their own transmissions on the medium. Therefore not resuming transmissions in subframe nu+1 can avoid potential interference. This is particularly applicable if the data transmitting circuitry is not quickly capable of switching from transmitting e.g. in subframe nu−1 to receiving in subframe nu for the purpose of sensing the channel according to an LBT procedure and switching back to transmitting in subframe nu+1. It is further beneficial if it is unclear for the data transmitting device what kind of LBT parameters are applicable, i.e. if it is not aware if the channel is still being kept reserved e.g. by the central node (such that other contenders cannot grab the channel) or not, or in case the duration during which the LBT procedure would need to sense the channel as clear is unclear. In other words, it may be difficult to perform LBT for subframe nu+1 and then still transmit in that subframe. If the UE cannot perform the LBT efficiently, a behavior based on discarding the conflicting grants for all granted subframes may be advantageous.

It is also possible to define the UE behavior based on UE capabilities.

According to an embodiment, if there is a conflict between an SSF and an MSF, the SSF grant is always ignored. In other words, irrespectively of the time of reception of the two grants, the SSF grant is not selected. Rather, the MSF grant is selected and the data are transmitted in accordance with the transmission parameters defined therein in the specified multiple subframes. This embodiment is beneficial for the implementation of the coding chain in the UE implementation. As an MSF is capable of assigning multiple subframes, it implies that the transmission of multiple transport blocks are granted, where the data segmentation can be facilitated in a uniform way. Since the data arriving from upper communication layers arrives in a pipeline fashion, it is beneficial if it is possible to process the data in a uniform way (as facilitated by an MSF DCI) compared to the case that the UE needs to provide for the possibility that a different data packet size is interspersed by an SSF DCI, which may easily cause data fragmentation in the pipeline and/or higher layer reordering procedures to establish an in-sequence delivery of data to upper communication layers at the receiver.

According to a further embodiment, the UE obeys the grant that has been received earlier in time. Such approach provides an advantage from a UE implementation perspective because the PUSCH transmission will obey the first grant in all cases. Thus, it is not necessary to implement an overriding or stopping mechanism for the case that a later DCI addresses the same subframe. Similar to the embodiment of always ignoring the SSF grant, there are resulting simplification benefits in the upper layer procedures such as data segmentation, data fragmentation, and reordering.

According to another embodiment, the UE obeys the grant which is more reliable as seen by the UE. In other words, there is predefined rule for evaluating reliability and irrespectively of the type of the grant and the time of receiving the grant, among the received grants the one most reliable is selected.

The reliability may be measured or evaluated in various different ways. The present disclosure is not limited to one of them. For instance, the grant protected with CRC having more bits is selected. Here it is assumed that the longer CRC provides more reliability in detecting an error in the received DCI. For example, a CRC with 16 bits has an higher undetectable error ratio compared to a CRC with 24 bits by a factor of 256. Accordingly, the DCI with more bits dedicated to CRC is selected for data transmission as it is assumed that probability of false alarm with larger CRC is smaller. Here, the term "false alarm" refers to a case in which a DCI is detected at the UE, where there was no grant transmitted to that UE. A consequence of following such erroneously received grant is a data transmission by the UE in resources which were not reserved for it. Such resources may have been reserved for another UE and parallel transmission by two different UEs in the same resources may likely result to reception of corrupted data at the base station. In addition, such a false alarm leads to wasted power that is transmitted by the UE since the eNB is not aware of the corresponding transmission.

It is noted that currently in LTE, there is no variable CRC length for DCI available. However, in NR or in other systems to which this disclosure also applies, the CRC may advantageously be configurable and/or may have different length for different types of DCI.

Another possibility to evaluate (measure) the reliability is based on the number of predefined-value bits or the length of the padding. Accordingly, a DCI with more reserved bits, and/or with more bits that have a pre-defined value, and/or with more bits spent for padding may be selected for data transmission. This criterion is particularly relevant, if the UE uses the padding bits and/or the predefined-value bits for checking the correctness of the reception.

For instance, according to an exemplary UE implementation, the UE receives a DCI and, within the DCI one or more padding bits. The padding bits are set to a known predefined value at the transmitter (base station). The UE then validates, whether or not the received padding bits have the expected predefined values. If the padding bits do not have the expected predefined values, it may be concluded that a transmission error occurred and the DCI is treated as incorrect or inconsistent. Accordingly, the padding bits provide some redundancy which can be also used to determine the reliability of the received DCI.

Furthermore, some DCI fields may have a fixed predefined value depending on the format of the DCI. Moreover, there may be only certain combinations of parameter values possible within the DCI. Any such predefined values or combination rules may be used at the receiver (UE) to check the validity of the DCI and thus also serve as a kind of reliability check. For instance, Section 9.2 of 3GPP TS 36.213, v13.3.0 from September 2016 describes a validation of PDCCH, EPDCCH and MPDCCH for semi-persistent scheduling. In particular, a UE validates a semi-persistent scheduling PDCCH (i.e. DCI received in the PDCCH) only if certain conditions are met such as successful CRC check and certain transmission parameters set to respective predefined values.

Still further criteria for evaluating the reliability is the estimated SINR. A grant received with higher estimated SINR is selected for the next data transmission.

Another option is to measure reliability by evaluating coding rate (ratio between the information bits and the total number of bits including also redundancy added by the forward error detection and/or correction code). In LTE, the control information is rate matched through puncturing and repetition to the number of bits that can be carried by a physical downlink control channel, considering the number of resources and/or modulation scheme being used for transmission of said channel.

It is noted that further options are possible such as number of resource elements used for transmission. It is assumed that the more the resource elements, the more reliable is the transmission. Accordingly, the grant with the highest number of resource elements for its conveying is selected.

The above criteria may be used alternatively or in any combination. For instance a weighted average (linear combination) of two or more of the above criteria is possible. However, the present disclosure is not limited thereto and any measure reflecting the reliability may be employed. For this measure one or more of the above parameters may be included and contribute linearly or non-linearly to the measure value.

The present disclosure is not limited to handling conflicts of two (different) grants. There may be three or more grants for the same subframe, i.e. carrying allocation for the same UE in the same subframe, with possibly different content (transmission parameters). As mentioned above, for different scenarios, different handling of the conflicts may be beneficial. One possible scenario is that a DCI is detected at a UE while there was no DCI sent to that UE. This is called in this text "false alarm". It is beneficial to reduce false alarms, as they waste resources and increase interference. Another possible scenario is intentional provision of two different grants for the same subframe by the base station. As explained above, this may be the case if a base station wishes to adapt the transmission parameters to the recent situation such as channel quality and load. Since for resolving the intentional and unintentional conflicts at the UE different respective approaches may be suitable, it is advantageous to enable configuration of the desired UE behavior. In particular, according to an embodiment, the base station or another network element is capable of configuring the UE to adopt or not to adopt at least one of the above described approaches upon conflict of two or more grants, such as:

Not transmitting data in a subframe for which a plurality of different grants were received.

Not transmitting data in any subframe specified in a plurality of different grants which specify at least one common subframe.

Not transmitting data in the subframe for which a plurality of different grants were received, but transmitting data in the remaining subframes specified by the plurality of grants.

Transmit data in a subframe according to the most recently received grant among a plurality of grants received for said subframe.

Transmit data in a subframe according to the first received grant among a plurality of grants received for said subframe.

Transmit data in a subframe according to the most reliable grant among a plurality of grants received for said subframe.

Between MSF and SSF grants prefer SSF grant(s).

Between MSF and SSF grants prefer MSF grant.

The criteria for selecting which of multiple received grants to follow, a combination of the above criteria may be used and signaled as a configuration for the UE behavior. For example, if there are more than two grants, two of them SSF and one MSF, the SSF grants may be generally selected and between the SSF the most recent one may be selected. Other combinations are also possible.

According to an exemplary UE behavior, if the UE detects conflicting PUSCH assignments for the same subframe nu, the UE shall transmit PUSCH according to the following sequence of priorities:

1) If the conflict results from a single-subframe grant and a multi-subframe grant, the UE follows the single-subframe grant.
2) If the conflict is not resolved by step 1), the UE follows the more recently received grant. In case of triggered scheduling, the UE considers the reception of the second stage as the receiving time of the grant.
3) Behavior for the remaining (without conflicting DCI) subframes of an MSF grant may be specified, e.g. that the transmission of data shall be performed in these subframes.

This may correspond to one of the configurable behaviors. Another one may be not to transmit data in the conflicting subframe(s).

The configuration may be performed, for instance by means of semi-static signaling such as RRC in LTE. However, the present disclosure is not limited thereto and in general, any kind of signaling may be applicable.

However, the present disclosure is not limited thereto and, in general, one of the above defined UE behaviors may be predefined in a standard. Definition in standard provides the advantage that both the base station and the UE know how the UE will behave, which reduces the misunderstandings and overhead (in terms of time, power and other resources). Alternatively, the UE may adopt one of the above approaches as an implementation specific approach. The node be then has to detect upon receiving data, which grant was followed. This may be performed, for instance by blind detection (i.e. trying the decoding of the transmitted data according to each of the conflicting grants and decide based on the results, which decoding was more reliable). However, such approach is less robust.

The above description provides examples which are described with the help of 3GPP terminology. However, as is clear to those skilled in the art, the present disclosure is not limited thereto. For instance, the term "subframe" may generally mean any predefined duration in the time domain which is allocable to a user device. Moreover, the term "grant" means any indication of resources in which data is to be received or transmitted. This may include specification of the time and/or frequency resource (or any other such as space and/or code) for the transmission, but also further transmission parameters such as MCS or the like which define how the data are to be transmitted.

Moreover, it is noted that the above examples show four subframes allocated by a single multiple subframe DCI. However, the present disclosure is not limited thereto. The MSF grant is configurable and may include resource allocation for less (e.g., 2 or 3) or more (more than 4) subframes. The same approached described above are applicable irrespectively of the particular number of subframes per MSF grant.

In summary, the present disclosure provides handling for the case of different DCI addressing the same UL subframe, and proposes to prioritise DCIs according to their reception time or whether single or multiple subframes are assigned or according to other criteria such as reliability of the received grant, or a combination of these criteria.

Figure 11:
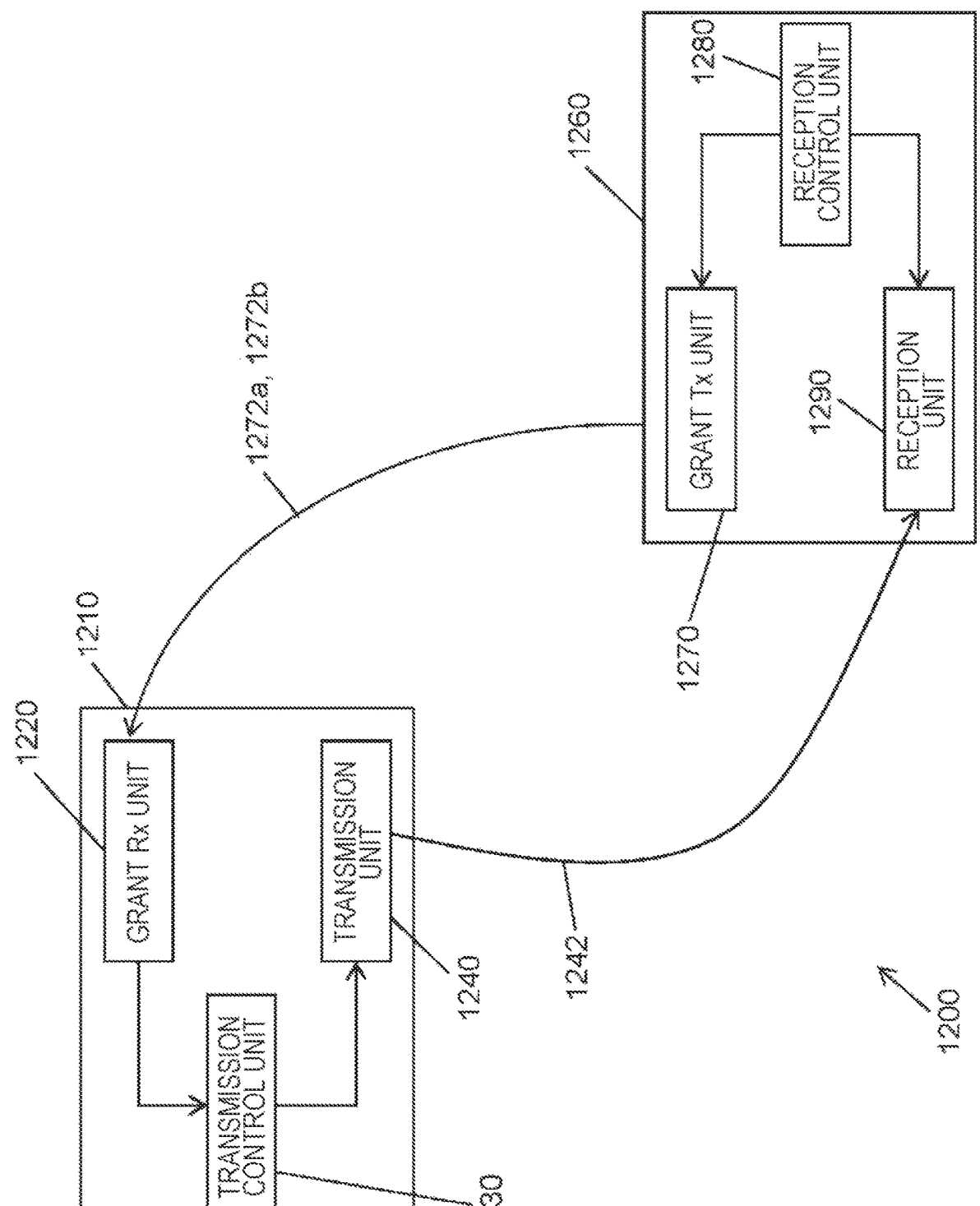
FIG. 11 is a block diagram illustrating apparatuses for handling situations in which for one subframes more than one different grants are received.

FIG. 11 shows a data transmitting device 1210 for transmitting data to a data receiving node 1260 over a wireless channel in a communication system 1200. The communication system may be a system such as LTE operating in licensed or unlicensed band and may at least comprise a user equipment and a base station. It is noted that a user equipment may also implement base station functionality with respect to other user equipment. The data transmitting device may be the UE and the data receiving device may be the base station in uplink and vice versa in downlink. The base station operates as a scheduling node, providing resource grants for the UE.

The data transmitting device 1210 comprises a grant receiving unit (circuitry) 1220 for receiving a first resource grant 1272*a* for a data transmission in a subframe and a second resource grant 1272*b* for a data transmission of data in said subframe.

It is noted that the first and the second grant are typically transmitted in different subframes. Based on the reception time (subframe), the data transmitting device 1210 is capable of determining the location of the resources in a particular subframe. Either there is a predefined offset between the grant reception and the data transmission, or the offset is signaled in the grant, or a combination of both. The resources may be further specified within the grant in terms of frequency and/or coding and modulation to be applied and further transmission parameters. In case of LTE, the grant may be carried in form of a DCI, the downlink control information.

The data transmitting device 1210 further comprises a transmission control unit (circuitry) 1230 for selecting according to which of the first resource grant and the second resource grant data are to be transmitted in the subframe; and a transmission unit (transmitter) 1240 for transmitting the data 1242 in the subframe according to the selected first grant or second grant.

The data receiving device 1260 for transmitting data to a data transmitting device 1210 over the wireless channel in a communication system 1200. The data receiving device 1260 comprises a grant transmitting unit (circuitry) 1270 for transmitting a first resource grant 1272a for a data transmission in a subframe and a second resource grant 1272b for a data transmission of data in said subframe to the data transmitting device 1260.

The data receiving device 1260 further comprises a reception control unit (circuitry) 1280 for determining according to which of the first resource grant and the second resource grant data are to be received in the subframe; and a reception unit (receiver) 1290 for receiving the data in the subframe according to the determined first grant or second grant.

The data transmitting device 1210 and/or the receiving device 1260 may further include the transmitter and receiver. The transmitter may include the antenna(s), amplifier(s), modulator, and coder, i.e. functional units and devices which enable the transmission/reception of the data and the grants respectively in accordance with the wireless interface specification. The transmitter may be part of the transmission unit (transmitter) 1240.

Similarly, the data transmitting device 1210 and/or the data receiving device 1260 may further include receiver with the antenna(s), amplifier(s), demodulator, decoder and other functional units and devices which enable transmission/reception of the data and grants according to the wireless interface specification.

FIG. 12 shows on the left hand side a method for transmitting data from a data transmitting node to a data receiving node over a wireless channel in a communication system. The method comprises receiving 1310, 1320 a first resource grant for a data transmission in a subframe and a second resource grant for a data transmission of data in said subframe. Moreover, the method comprises selecting 1330 according to which of the first resource grant and the second resource grant data are to be transmitted in the subframe; and transmitting 1340 the data in the subframe according to the selected first grant or second grant.

Correspondingly, a method for receiving data from a data transmitting device over a wireless channel in a communication system is shown on the right hand side of FIG. 12 and transmitting 1360, 1370 a first resource grant for a data transmission in a subframe and a second resource grant for a data transmission of data in said subframe to the data transmitting device; determining according to which of the first resource grant and the second resource grant data are to be received in the subframe; and receiving 1380 the data in the subframe according to the determined first grant or second grant.

The determining step may be performed either based on the knowledge of the UE behavior or based on "trial-and-error" multiple hypotheses testing by trying to decode the data with transmission parameters of the conflicting grants and checking the result.

For example, the transmission parameters indicated by the first grant and second grant differ in at least one parameter.

According to an embodiment, the first resource grant is a multiple subframe grant indicating allocation of resources for a plurality of subframes of the communication system; and the second resource grant is a single subframe grant indicating allocation of resources for a single subframe of the communication system.

According to another embodiment, the single subframe grant is selected. For instance, the first resource grant is selected when the first resource grant was received after receiving the second resource grant, and the second resource grant is selected when the second resource grant was received after receiving the first resource grant.

Advantageously, when the first resource grant or the second resource grant, which was not selected for data transmission in said subframe, is a multiple subframe grant indicating allocation of resources for a plurality of subframes of the communication system, data are transmitted in the allocated plurality of subframes according to the multiple subframe grant except for said subframe.

Alternatively, when the first resource grant or the second resource grant, which was not selected for data transmission in said subframe, is a multiple subframe grant indicating allocation of resources for a plurality of subframes of the communication system, data are not transmitted according to the multiple subframe grant in the allocated plurality of subframes following said subframe, According to an embodiment, the multiple subframe grant is selected.

According to an embodiment, the first resource grant is selected when the first resource grant was received before receiving the second resource grant, and the second resource grant is selected when the second resource grant was received before receiving the first resource grant.

According to a further embodiment, a measure of reliability is obtained for the first resource grant and the second resource grant, and among the first and the second resource grant the one for which the reliability measure indicated higher reliability is selected.

The reliability measure is advantageously determined according to one or more of the following parameters:

Cyclic Redundancy Check, CRC, length for the control information carrying the grant, Number of bits with predefined values in the control information carrying the grant, Number of padding bits in the control information carrying the grant, Estimated value of the Signal to Interference and Noise Ratio, SINR, Coding rate for the control information carrying the grant, and Number of resource element used to carry the control information carrying the grant.

For instance, at least one of the first resource grant and the second resource grant is received within a dedicated control information signaling from the data receiving node, the dedicated control information specifying one or more of the modulation and coding scheme, a single subframe or multiple subframes in which resources are allocated, a scheduling delay indicating the location of the allocates one or more subframes.

In accordance with another embodiment, a (non-transitory) computer readable medium is provided with a program stored therein, which when running on a computer, executes the steps of the above described method.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

In summary, the present disclosure relates to a data transmitting device, data receiving device and the corresponding data transmitting method and data receiving method for transmitting/receiving data over a wireless channel in a communication system. In particular, a first resource grant is received for a data transmission in a subframe and a second resource grant for a data transmission of data in said subframe. Then, it is determined, according to which of the first resource grant and the second resource grant data are to be transmitted in the subframe; and the data is transmitted in the subframe according to the selected first grant or second grant.

What is claimed is:

1. A data transmitting device for transmitting data to a data receiving node over a wireless channel in a communication system, the data transmitting device comprising:
grant receiving circuitry, which, in operation, receives a first resource grant and a second resource grant, wherein the first resource grant is a multiple subframe grant indicating allocation of resources for a plurality of subframes, and the second resource grant is a single subframe grant indicating allocation of resources for a single subframe;
transmission control circuitry, which, in operation, selects the first resource grant or the second resource grant for data to be transmitted in a first subframe, and selects the first resource grant or the second resource grant for data to be transmitted in a second subframe, wherein,
in a case where (1) the first subframe is one of the plurality of subframes and the single subframe and (2) the second subframe is another one of the plurality of subframes and is prior to the first subframe, the transmission control circuitry selects the second resource grant for the data to be transmitted in the first subframe, selects the first resource grant for the data to be transmitted in the second subframe, and selects neither the first resource grant nor the second resource grain for data to be transmitted subframes of the plurality of subframes that are subsequent to the first subframe; and
a transmitter, which, in operation, transmits the data in the first subframe according to the selected first resource grant or second resource grant for the data to be transmitted in the first subframe, and transmits the data in the second subframe according to the selected first resource grant or second resource grant for the data to be transmitted in the second subframe.

2. The data transmitting device according to claim 1, wherein the first resource grant indicates first transmission parameters, and the second resource grant indicates second transmission parameters that differ in at least one parameter from the first transmission parameters.

3. The data transmitting device according to claim 1, wherein
in a case where (1) the first subframe is one of the plurality of subframes and the single subframe and (2) the second subframe is another one of the plurality of subframes, the transmission control circuitry, regardless of whether the second resource grant was received prior to the first resource grant or subsequent to the first resource grant, selects the second resource grant for the data to be transmitted in the first subframe and selects the first resource grant for the data to be transmitted in the second subframe, and,
in the case where (1) the first subframe is one of the plurality of subframes and the single subframe and (2) the second subframe is another one of the plurality of subframes, the first resource grant is disobeyed for the data to be transmitted in the first subframe.

4. The data transmitting device according to claim 1, wherein,
in a case where (1) the first resource grant was not selected for the data to be transmitted in the first subframe and (2) the first subframe is one of the plurality of subframes and the single subframe, the transmitter does not transmit data according to the first resource grant in a subframe that is one of the plurality of subframes and is subsequent to the first subframe.

5. The data transmitting device according to claim 2, wherein the transmission control circuitry, in operation:
obtains a measure of reliability for the first resource grant and the second resource grant, and
selects among the first and the second resource grant the one for which the reliability measure indicated higher reliability for data to be transmitted in a third subframe.

6. The data transmitting device according to claim 5, wherein the reliability measure is determined according to one or more of the following parameters:
Cyclic Redundancy Check, CRC, length for control information carrying the grant, Number of bits with predefined values in the control information carrying the grant, Number of padding bits in the control information carrying the grant, Estimated value of a Signal to Interference and Noise Ratio, SINR, Coding rate for the control information carrying the grant, and Number of resource element used to carry the control information carrying the grant.

7. The data transmitting device according to claim 1, wherein at least one of the first resource grant or the second resource grant is received within a dedicated control information signaling from the data receiving node, and the dedicated control information specifies one or more of the following information: a modulation and coding scheme, a single subframe or multiple subframes in which resources are allocated, and a scheduling delay indicating a location of the allocated one or more subframes.

8. A data receiving device for receiving data from a data transmitting device over a wireless channel in a communication system, the data receiving device comprising:

grant transmitting circuitry, which, in operation, transmits a first resource grant and a second resource grant to the data transmitting device, wherein the first resource grant is a multiple subframe grant indicating allocation of resources for a plurality of subframes, and the second resource grant is a single subframe grant indicating allocation of resources for a single subframe;

reception control circuitry, which, in operation, determines according to which of the first resource grant and the second resource grant data is to be received in a first subframe, and determines according to which of the first resource cram and the second resource grant data to be received in a second subframe, wherein, in a case where (1) the first subframe is one of the subframes and the single subframe and (2) the second subframe is another one of the plurality of subframes and is prior to the first subframe, the reception control circuitry determines the data is to be received in the first subframe according to the second resource grant, determines the data is to be received in the second subframe according to the first resource grant, and determines data is to be received in subframes of the plurality of subframes that are subsequent to the first subframe according to neither the first resource grant nor the second resource grant; and a receiver, which, in operation, receives the data in the first subframe according to the determined first resource grant or second resource grant for the data in the first subframe, and receives the data in the second subframe according to the determined first resource grant or second resource grant for the data in the second subframe.

9. A method for transmitting data from a data transmitting node to a data receiving node over a wireless channel in a communication system, the method comprising:

receiving, by the data transmitting node, a first resource grant and a second resource grant, wherein the first resource grant is a multiple subframe grant indicating allocation of resources for a plurality of subframes, and the second resource grant is a single subframe grant indicating allocation of resources for a single subframe; and selecting, by the data transmitting node, the second resource grant for data to be transmitted in a first subframe;

selecting, by the data transmitting node, the first resource grant for the data to be transmitted in a second subframe, wherein the first subframe is one of the plurality of subframes and the single subframe, the second subframe is another one of the plurality of subframes and is prior to the first subframe, the data transmitting node selects neither the first resource grant nor the second resource grant for data to be transmitted in subframes of the plurality of subframes that are subsequent to the first subframe; and transmitting, by the data transmitting node, the data in the first subframe according to the selected second resource grant, and the data in the second subframe according to the selected first resource grant.

10. A method for receiving, by a data receiving device, data from a data transmitting device over a wireless channel in a communication system, the method comprising:

transmitting, by the data receiving device, a first resource grant and a second resource grant to the data transmitting device, wherein the first resource grant is a multiple subframe grant indicating allocation of resources for a plurality of subframes, and the second resource grant is a single subframe grant indicating allocation of resources for a single subframe;

determining, by the data receiving device, data is to be received in a first subframe according to the second resource grant;

determining, by the data receiving device, data is to be received in a second subframe according to the first resource grant, wherein the first subframe is one of the plurality of subframes and the single subframe, the second subframe is another one of the plurality of subframes and is prior to the first subframe, the data receiving device determines data is to be received in subframes of the plurality of subframes that are subsequent to the first subframe according to neither the first resource grant nor the second resource grant; and receiving, by the data receiving device, the data in the first subframe according to the determined second resource grant and the data in the second subframe according to the determined first resource grant.

11. The data transmitting device according to claim 3, wherein, in the case where (1) the first subframe is one of the plurality of subframes and the single subframe and (2) the second subframe is another one of the plurality of subframes, the transmission control circuitry selects the second resource grant for the data to be transmitted in the first subframe, and selects the first resource grant for data to be transmitted in the plurality of subframes except for the first subframe.

* * * * *